US012795513B2

(12) United States Patent
Zhang et al.

(10) Patent No.: US 12,795,513 B2
(45) Date of Patent: Nov. 10, 2026

(54) PERSONAL INTERNET OF THINGS NETWORK ARCHITECTURE

(71) Applicant: QUALCOMM Incorporated, San Diego, CA (US)

(72) Inventors: Kefeng Zhang, Beijing (CN); Haris Zisimopoulos, London (GB); Sebastian Speicher, Wallisellen (CH); Hong Cheng, Basking Ridge, NJ (US); Zhimin Du, Beijing (CN); Yan Li, Beijing (CN); Yang Liu, Beijing (CN); Yiqing Cao, Beijing (CN)

(73) Assignee: QUALCOMM Incorproated, San Diego, CA (US)

( * ) Notice: Subject to any disclaimer, the term of this patent is extended or adjusted under 35 U.S.C. 154(b) by 189 days.

(21) Appl. No.: 18/730,211

(22) PCT Filed: Mar. 29, 2022

(86) PCT No.: PCT/CN2022/083603

§ 371 (c)(1),
(2) Date: Jul. 18, 2024

(87) PCT Pub. No.: WO2023/184137

PCT Pub. Date: Oct. 5, 2023

(65) Prior Publication Data

US 2025/0159589 A1 May 15, 2025

(51) Int. Cl.

| | |
|---|---|
| ***H04W 76/11*** | (2018.01) |
| ***H04W 48/08*** | (2009.01) |
| ***H04W 60/00*** | (2009.01) |

(52) U.S. Cl.
CPC ........... *H04W 48/08* (2013.01); *H04W 60/00* (2013.01); *H04W 76/11* (2018.02)

(58) Field of Classification Search
CPC ...... H04W 48/08; H04W 76/11; H04W 60/00
(Continued)

(56) References Cited

U.S. PATENT DOCUMENTS

| | | | | |
|---|---|---|---|---|
| 2018/0255611 | A1 | 9/2018 | Li et al. | |
| 2021/0368341 | A1* | 11/2021 | Liao | H04W 12/06 |

FOREIGN PATENT DOCUMENTS

| | | | |
|---|---|---|---|
| CN | 107645756 | A * | 1/2018 |
| CN | 112105072 | A | 12/2020 |
| CN | 113365281 | A | 9/2021 |

OTHER PUBLICATIONS

"3rd Generation Partnership Project; Technical Specification Group Services and System Aspects; Study on architecture enhancements for Personal IoT Network (PIN) (Release 18)", 3GPP TR 23.700-88, VO. 1.0, 3rd Generation Partnership Project, Mobile Competence Centre, 650, Route Des Lucioles, F-06921, Sophia-Antipolis Cedex, France, No. V0.1.0, Mar. 3, 2022, 12 Pages, XP052144341, 5.2 Key Issue #2: PIN and PIN Element discovery and selection, 5.3 Key Issue #3: Management of PIN and PIN Elements, 5.4 Key Issue #4: Communication of PIN.

(Continued)

*Primary Examiner* — Ayman A Abaza
*Assistant Examiner* — Hasan Ali Cheema
(74) *Attorney, Agent, or Firm* — Holland & Hart LLP

(57) ABSTRACT

Methods, systems, and devices for wireless communications are described. A person Internet of Things (IoT) network (PIN) architecture may support configuration and management of a PIN. The PIN architecture may include a first network node configured to establish the PIN, a second network node configured as a network gateway for the PIN, a third network node configured as a network management element for the PIN, and a PINE. The first network node may receive, via a user plane of a network, information from the second network node that triggers the first network node to
(Continued)

establish the PIN. The first network node may transmit information that identifies and configures the second network node and the third network node as the network gateway and the network management element, respectively. The second network node may relay communications between the PINE and the network.

46 Claims, 20 Drawing Sheets

(58) Field of Classification Search
USPC .......................................................... 370/329
See application file for complete search history.

(56) References Cited

OTHER PUBLICATIONS

Supplementary European Search Report EP22933994 Search Authority Munich Oct. 22, 2025 (2203322EP).
International Search Report and Written Opinion—PCT/CN2022/083603—ISA/EPO—Dec. 15, 2022.
Vivo Mobile Communications Co. Ltd, et al., "New SID on Personal IoT Network Architecture", TSG SA Rel-18, Prioritization Workshop, SP-211165, Dec. 10, 2021, 4 pages, The Whole Document.
"3rd Generation Partnership Project; Technical Specification Group Services and System Aspects; Study on architecture enhancements for Personal IoT Network (PIN) (Release 18)", 3GPP TR 23.700-88, V0. 1.0, 3rd Generation Partnership Project, Mobile Competence Centre, 650, Route Des Lucioles, F-06921, Sophia-Antipolis Cedex, France, No. V0.1.0, Mar. 3, 2022, 12 Pages, XP052144341, 5.2 Key Issue #2: PIN and PIN Element discovery and selection, 5.3 Key Issue #3: Management of PIN and PIN Elements, 5.4 Key Issue #4: Communication of PIN.
"3rd Generation Partnership Project, Technical Specification Group Services and System Aspects, Study on Personal Internet of Things (PIoT) networks (Release 18)", 3GPP TR 22.859, 3rd Generation Partnership Project, Mobile Competence Centre, 650, Route Des Lucioles, F-06921, Sophia-Antipolis Cedex, France, No. V18.2.0, Dec. 24, 2021, 51 Pages, XP052083487, 5.11 Dynamic creation of an on-demand PIN at home, 5.12 Operator managed PIN.
Alawi M.A., et al., "Simplified Gateway Selection Scheme for Multihop Relay In Vehicular ad hoc Network", International Journal of Communication Systems, Wiley, Chichester, GB, vol. 27, No. 12, Jun. 24, 2013, pp. 3855-3873, XP071993764, DOI: 10.1002/DAC.2581, abstract, figures 1-3, 2. Related Work, 3.2 GV disovery mechanism.
China Telecom, et al., "Key Issue of support for management of the PIN and its elements", 3GPP SA WG2 Meeting #149e, S2-2201798, 3rd Generation Partnership Project, Mobile Competence Centre, 650, Route Des Lucioles, F-06921, Sophia-Antipolis Cedex, France, vol. SA WG2, No. Electronic meeting, Oct. 14, 2022-Oct. 25, 2022, Feb. 25, 2022, 2 Pages, XP052117129, 5.X Key Issue #X: Management of PIN and PIN Elements.
Supplementary European Search Report EP22933994 Search Authority Munich Oct. 22, 2025.
3GPP TS 22.261: "3rd Generation Partnership Project, Technical Specification Group Services and System Aspects, Service Requirements for the 5G System, Stage 1 (Release 18)", 3GPP Standard, Technical Specification, 3GPP TS 22.261, 3rd Generation Partnership Project 3GPP), Mobile Competence Centre, 650, Route Des Lucioles, F-06921 Sophia-Antipolis Cedex, France, vol. SA WG1, No. V18.5.0, Dec 24, 2021, pp. 1-115, XP052083482, section 1, section 6.9.2, section 6.42.

* cited by examiner

PERSONAL INTERNET OF THINGS NETWORK ARCHITECTURE

CROSS REFERENCE

The present application is a 371 national phase filing of International PCT Application No. PCT/CN2022/083603 by ZHANG et al., entitled “PERSONAL INTERNET OF THINGS NETWORK ARCHITECTURE,” filed Mar. 29, 2022, which is assigned to the assignee hereof, and which is expressly incorporated by reference in its entirety herein.

INTRODUCTION

The following relates to wireless communications relating to personal Internet of Things (IoT) network (PIN) architectures.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support a personal Internet of Things (IoT) network (PIN) architecture. For example, the described PIN architecture may support the configuration and management of PINs and the wireless devices included therein. For instance, a PIN may include at least one PIN element with management capability (PEMC), at least one PIN element with gateway capability (PEGC), and at least one PIN element (PINE). A PINE may be a wireless device that does not support accessing a network (e.g., via a radio access network), such as a non-cellular capable wireless device, a non-Third Generation Partnership Project (3GPP) device, or a WIFI and/or Bluetooth exclusive device. A PEGC may support accessing the network and may relay traffic between a PINE and the network such that communications between the PINE and the network are supported, among other operations described herein. A PEMC may support management operations of the PIN as described herein.

To support communications between the network and nodes of the PIN (e.g., the PINE(s), PEGC(s), and PEMC(s)), the PIN may include a PIN application server. For example, the PIN application server may receive a message (e.g., from a PEMC) that triggers (e.g., requests) the PIN application server to establish the PIN. The PIN application server may transmit information that identifies and configures the PEGC and the PEMC. Additionally, the PIN application server may support the registration and configuration of PINEs, PEGCs, and PEMCs within the PIN. The PIN application server may interface with one or more network functions of the network such that communications between the nodes of the PIN and the network may be supported. By including the PIN application server within the PIN architecture, management of the PIN and network connectivity for the PIN may be supported, among other benefits.

A method for wireless communication at a first network node is described. The method may include receiving first information that triggers the first network node to establish a first network that includes a second network node and one or more network elements configured to communicate with each other using a first wireless communication technology, transmitting, based on the first information via a user plane of a second network, second information to a second network node, where the second information includes network gateway identification information that identifies the second network node as a network gateway for the first network, where the second information includes gateway configuration information indicative of a gateway configuration for the second network node, and where the one or more network elements are configured to communicate with the second network via the second network node configured as the network gateway using a second wireless communication technology, and transmitting, based on the first information via the user plane of the second network, third information to a third network node, where the third information includes network management identification information that identifies the third network node as a network management element for the first network, and where the third information includes network management configuration information indicative of a management configuration for the third network node.

An apparatus for wireless communication at a first network node is described. The apparatus may include a memory and at least one processor coupled to the memory. The at least one processor may be configured to receive first information that triggers the first network node to establish a first network that includes a second network node and one or more network elements configured to communicate with each other using a first wireless communication technology, transmit, based on the first information via a user plane of a second network, second information to a second network node, where the second information includes network gateway identification information that identifies the second network node as a network gateway for the first network, where the second information includes gateway configuration information indicative of a gateway configuration for the second network node, and where the one or more network elements are configured to communicate with the second network via the second network node configured as the network gateway using a second wireless communication technology, and transmit, based on the first information via the user plane of the second network, third information to a third network node, where the third information includes network management identification information that identifies the third network node as a network management element for the first network, and where the third information includes network management configuration information indicative of a management configuration for the third network node.

Another apparatus for wireless communication at a first network node is described. The apparatus may include means for receiving first information that triggers the first network node to establish a first network that includes a second network node and one or more network elements configured to communicate with each other using a first wireless communication technology, means for transmitting, based on the first information via a user plane of a second network, second information to a second network node, where the second information includes network gateway identification information that identifies the second network node as a network gateway for the first network, where the second information includes gateway configuration information indicative of a gateway configuration for the second network node, and where the one or more network elements are configured to communicate with the second network via the second network node configured as the network gateway using a second wireless communication technology, and means for transmitting, based on the first information via the user plane of the second network, third information to a third network node, where the third information includes network management identification information that identifies the third network node as a network management element for the first network, and where the third information includes network management configuration information indicative of a management configuration for the third network node.

A non-transitory computer-readable medium storing code for wireless communication at a first network node is described. The code may include instructions executable by a processor to receive first information that triggers the first network node to establish a first network that includes a second network node and one or more network elements configured to communicate with each other using a first wireless communication technology, transmit, based on the first information via a user plane of a second network, second information to a second network node, where the second information includes network gateway identification information that identifies the second network node as a network gateway for the first network, where the second information includes gateway configuration information indicative of a gateway configuration for the second network node, and where the one or more network elements are configured to communicate with the second network via the second network node configured as the network gateway using a second wireless communication technology, and transmit, based on the first information via the user plane of the second network, third information to a third network node, where the third information includes network management identification information that identifies the third network node as a network management element for the first network, and where the third information includes network management configuration information indicative of a management configuration for the third network node.

Some examples of the method, apparatuses, and non-transitory computer-readable medium described herein may further include operations, features, means, or instructions for transmitting, to at least one of the second network node, the third network node, or a network element of the one or more network elements, registration information to enable one or more additional network elements to join the first network.

Some examples of the method, apparatuses, and non-transitory computer-readable medium described herein may further include operations, features, means, or instructions for transmitting, to at least one of the second network node, the third network node, or a network element of the one or more network elements, registration information to enable the network element to be at least one of: an additional network gateway for the first network, or an additional network management element for the first network.

Some examples of the method, apparatuses, and non-transitory computer-readable medium described herein may further include operations, features, means, or instructions for receiving a profile from at least one of the second network node, the third network node, or a network element of the one or more network elements, where the profile includes at least one of wireless communication technology capability information or an identifier for association with the first network.

In some examples of the method, apparatuses, and non-transitory computer-readable medium described herein, the wireless communication technology capability information indicates that a non-cellular technology may be supported by the second network node or the network element from which the profile may be received.

Some examples of the method, apparatuses, and non-transitory computer-readable medium described herein may further include operations, features, means, or instructions for associating the profile with role information indicative of a role in the first network of the second network node, the third network node, or the network element.

Some examples of the method, apparatuses, and non-transitory computer-readable medium described herein may further include operations, features, means, or instructions for receiving an indication of whether a network element of the one or more network elements may be active or inactive in the first network.

Some examples of the method, apparatuses, and non-transitory computer-readable medium described herein may further include operations, features, means, or instructions for receiving an indication of whether the first network may be active or inactive.

Some examples of the method, apparatuses, and non-transitory computer-readable medium described herein may further include operations, features, means, or instructions for transmitting, to at least one of the second network node, the third network node, or a network element of the one or more network elements of the first network, management policy information of the first network.

Some examples of the method, apparatuses, and non-transitory computer-readable medium described herein may further include operations, features, means, or instructions for receiving billing information pertaining to use of the first network by one or more of the second network node, the third network node, or a network element of the one or more network elements of the first network.

Some examples of the method, apparatuses, and non-transitory computer-readable medium described herein may further include operations, features, means, or instructions for receiving network usage information pertaining to use of the first network by one or more of the second network node, the third network node, or a network element of the one or more network elements of the first network.

Some examples of the method, apparatuses, and non-transitory computer-readable medium described herein may further include operations, features, means, or instructions for transmitting, to at least one of the second network node or the third network node, quality of service (QoS) control information for communication between the one or more network elements and the second network.

Some examples of the method, apparatuses, and non-transitory computer-readable medium described herein may further include operations, features, means, or instructions for interfacing with one or more network functions of the second network regarding access between the first network and the second network.

In some examples of the method, apparatuses, and non-transitory computer-readable medium described herein, the access between the first network and the second network may be regulated by at least one of a subscription or a policy which may be communicated between the first network node and the one or more network functions of the second network.

In some examples of the method, apparatuses, and non-transitory computer-readable medium described herein, the one or more network functions of the second network include a network exposure function (NEF), a policy control function (PCF), a unified data management (UDM) function, or a unified data repository (UDR) function.

In some examples of the method, apparatuses, and non-transitory computer-readable medium described herein, the second network node and the third network node may be a same network node.

In some examples of the method, apparatuses, and non-transitory computer-readable medium described herein, the first wireless communication technology may be a non-cellular technology and the second wireless communication technology may be a cellular technology.

In some examples of the method, apparatuses, and non-transitory computer-readable medium described herein, the first network may be a PIN.

A method for wireless communication at a first network node is described. The method may include transmitting first information to a second network node that triggers the establishment of a first network that includes a network gateway and one or more network elements configured to communicate with each other using a first wireless communication technology, where the one or more network elements are configured to communicate with a second network via the network gateway using a second wireless communication technology and receiving, in response to the first information via a user plane of the second network, second information from the second network node, where the second information includes network management identification information that identifies the first network node as a network management element for the first network, and where the second information includes network management configuration information indicative of a management configuration for the first network node.

An apparatus for wireless communication at a first network node is described. The apparatus may include a memory and at least one processor coupled to the memory. The at least one processor may be configured to transmit first information to a second network node that triggers the establishment of a first network that includes a network gateway and one or more network elements configured to communicate with each other using a first wireless communication technology, where the one or more network elements are configured to communicate with a second network via the network gateway using a second wireless communication technology and receive, in response to the first information via a user plane of the second network, second information from the second network node, where the second information includes network management identification information that identifies the first network node as a network management element for the first network, and where the second information includes network management configuration information indicative of a management configuration for the first network node.

Another apparatus for wireless communication at a first network node is described. The apparatus may include means for transmitting first information to a second network node that triggers the establishment of a first network that includes a network gateway and one or more network elements configured to communicate with each other using a first wireless communication technology, where the one or more network elements are configured to communicate with a second network via the network gateway using a second wireless communication technology and means for receiving, in response to the first information via a user plane of the second network, second information from the second network node, where the second information includes network management identification information that identifies the first network node as a network management element for the first network, and where the second information includes network management configuration information indicative of a management configuration for the first network node.

A non-transitory computer-readable medium storing code for wireless communication at a first network node is described. The code may include instructions executable by a processor to transmit first information to a second network node that triggers the establishment of a first network that includes a network gateway and one or more network elements configured to communicate with each other using a first wireless communication technology, where the one or more network elements are configured to communicate with a second network via the network gateway using a second wireless communication technology and receive, in response to the first information via a user plane of the second network, second information from the second network node, where the second information includes network management identification information that identifies the first network node as a network management element for the first network, and where the second information includes network management configuration information indicative of a management configuration for the first network node.

Some examples of the method, apparatuses, and non-transitory computer-readable medium described herein may further include operations, features, means, or instructions for communicating with the second network node to establish the first network.

Some examples of the method, apparatuses, and non-transitory computer-readable medium described herein may further include operations, features, means, or instructions for communicating with the second network node to modify, delete, activate, or deactivate the first network.

Some examples of the method, apparatuses, and non-transitory computer-readable medium described herein may further include operations, features, means, or instructions for communicating with the second network node to remove a network element of the one or more network elements from the first network.

Some examples of the method, apparatuses, and non-transitory computer-readable medium described herein may further include operations, features, means, or instructions for communicating with the second network node to add a network element of the one or more network elements to the first network.

Some examples of the method, apparatuses, and non-transitory computer-readable medium described herein may further include operations, features, means, or instructions for communicating with the second network node to add an additional network element to the first network.

Some examples of the method, apparatuses, and non-transitory computer-readable medium described herein may further include operations, features, means, or instructions for communicating with the second network node in order to remove the network gateway from the first network.

Some examples of the method, apparatuses, and non-transitory computer-readable medium described herein may further include operations, features, means, or instructions for communicating with the second network node in order to add the network gateway to the first network.

Some examples of the method, apparatuses, and non-transitory computer-readable medium described herein may further include operations, features, means, or instructions for communicating with the second network node in order to add an additional network gateway to the first network.

Some examples of the method, apparatuses, and non-transitory computer-readable medium described herein may further include operations, features, means, or instructions for communicating with the second network node regarding a period of time for which at least one of the first network, the network gateway, or a network element of the one or more network elements may be valid.

Some examples of the method, apparatuses, and non-transitory computer-readable medium described herein may further include operations, features, means, or instructions for communicating with the second network node regarding a status of at least one of the first network or a network element of the one or more network elements, the status indicating whether the first network may be active or inactive or whether the network element may be active or inactive within the first network.

In some examples of the method, apparatuses, and non-transitory computer-readable medium described herein, the first network node and the network gateway may be a same network node.

In some examples of the method, apparatuses, and non-transitory computer-readable medium described herein, the first wireless communication technology may be a non-cellular technology and the second wireless communication technology may be a cellular technology.

In some examples of the method, apparatuses, and non-transitory computer-readable medium described herein, the first network may be a PIN.

A method for wireless communication at a first network node is described. The method may include receiving first information from a second network node including network gateway identification information that identifies the first network node as a network gateway in a first network, where the first network includes the network gateway and one or more network elements configured to communicate with each other using a first wireless communication technology, where the one or more network elements are configured to communicate with a second network via the first network node configured as the network gateway using a second wireless communication technology, and where the first information is received via a user plane of the second network and relaying communication between the second network and the one or more network elements in accordance with management by a third network node that is a network management element for the first network.

An apparatus for wireless communication at a first network node is described. The apparatus may include a memory and at least one processor coupled to the memory. The at least one processor may be configured to receive first information from a second network node including network gateway identification information that identifies the first network node as a network gateway in a first network, where the first network includes the network gateway and one or more network elements configured to communicate with each other using a first wireless communication technology, where the one or more network elements are configured to communicate with a second network via the first network node configured as the network gateway using a second wireless communication technology, and where the first information is received via a user plane of the second network and relay communication between the second network and the one or more network elements in accordance with management by a third network node that be a network management element for the first network.

Another apparatus for wireless communication at a first network node is described. The apparatus may include means for receiving first information from a second network node including network gateway identification information that identifies the first network node as a network gateway in a first network, where the first network includes the network gateway and one or more network elements configured to communicate with each other using a first wireless communication technology, where the one or more network elements are configured to communicate with a second network via the first network node configured as the network gateway using a second wireless communication technology, and where the first information is received via a user plane of the second network and means for relaying communication between the second network and the one or more network elements in accordance with management by a third network node that is a network management element for the first network.

A non-transitory computer-readable medium storing code for wireless communication at a first network node is described. The code may include instructions executable by a processor to receive first information from a second network node including network gateway identification information that identifies the first network node as a network gateway in a first network, where the first network includes the network gateway and one or more network elements configured to communicate with each other using a first wireless communication technology, where the one or more network elements are configured to communicate with a second network via the first network node configured as the network gateway using a second wireless communication technology, and where the first information is received via a user plane of the second network and relay communication between the second network and the one or more network elements in accordance with management by a third network node that be a network management element for the first network.

Some examples of the method, apparatuses, and non-transitory computer-readable medium described herein may further include operations, features, means, or instructions for provisioning one or more resources to the one or more network elements for communication between the one or more network elements within the first network.

Some examples of the method, apparatuses, and non-transitory computer-readable medium described herein may further include operations, features, means, or instructions for relaying communication between two network elements via the first network in accordance with management by the third network node.

Some examples of the method, apparatuses, and non-transitory computer-readable medium described herein may further include operations, features, means, or instructions for communicating, with a network element of the one or more network elements, management information associated with deletion of the network element from the first network and transmitting an indication to the second network node or the third network node of the deletion.

Some examples of the method, apparatuses, and non-transitory computer-readable medium described herein may further include operations, features, means, or instructions for communicating, with a network element of the one or more network elements, discovery information associated with addition of the network element to the first network and transmitting an indication to the second network node or the third network node of the addition.

Some examples of the method, apparatuses, and non-transitory computer-readable medium described herein may further include operations, features, means, or instructions for communicating, with an additional network element, discovery information associated with addition of the additional network element to the first network and transmit an indication to the second network node or the third network node of the addition.

Some examples of the method, apparatuses, and non-transitory computer-readable medium described herein may further include operations, features, means, or instructions for transmitting, to the second network node, an indication of a status of the one or more network elements, the status indicating whether individual ones of the one or more network elements may be active or inactive within the first network.

Some examples of the method, apparatuses, and non-transitory computer-readable medium described herein may further include operations, features, means, or instructions for providing access to the second network for the one or more network elements of the first network, the access provided in accordance with a traffic management policy of at least one of the second network node or the third network node.

Some examples of the method, apparatuses, and non-transitory computer-readable medium described herein may further include operations, features, means, or instructions for transmitting, to the second network node, a report indicative of network usage information of one or more of the one or more network elements of the first network.

Some examples of the method, apparatuses, and non-transitory computer-readable medium described herein may further include operations, features, means, or instructions for establishing a downlink path for communications from the second network to a network element of the one or more network elements of the first network.

Some examples of the method, apparatuses, and non-transitory computer-readable medium described herein may further include operations, features, means, or instructions for managing, independent of the first network, traffic routing for communications between additional network nodes unable to join or not present in the first network.

In some examples of the method, apparatuses, and non-transitory computer-readable medium described herein, the first network node and the network management element may be a same network node.

In some examples of the method, apparatuses, and non-transitory computer-readable medium described herein, the first wireless communication technology may be a non-cellular technology and the second wireless communication technology may be a cellular technology.

In some examples of the method, apparatuses, and non-transitory computer-readable medium described herein, the first network may be a PIN.

DETAILED DESCRIPTION

Figure 1:
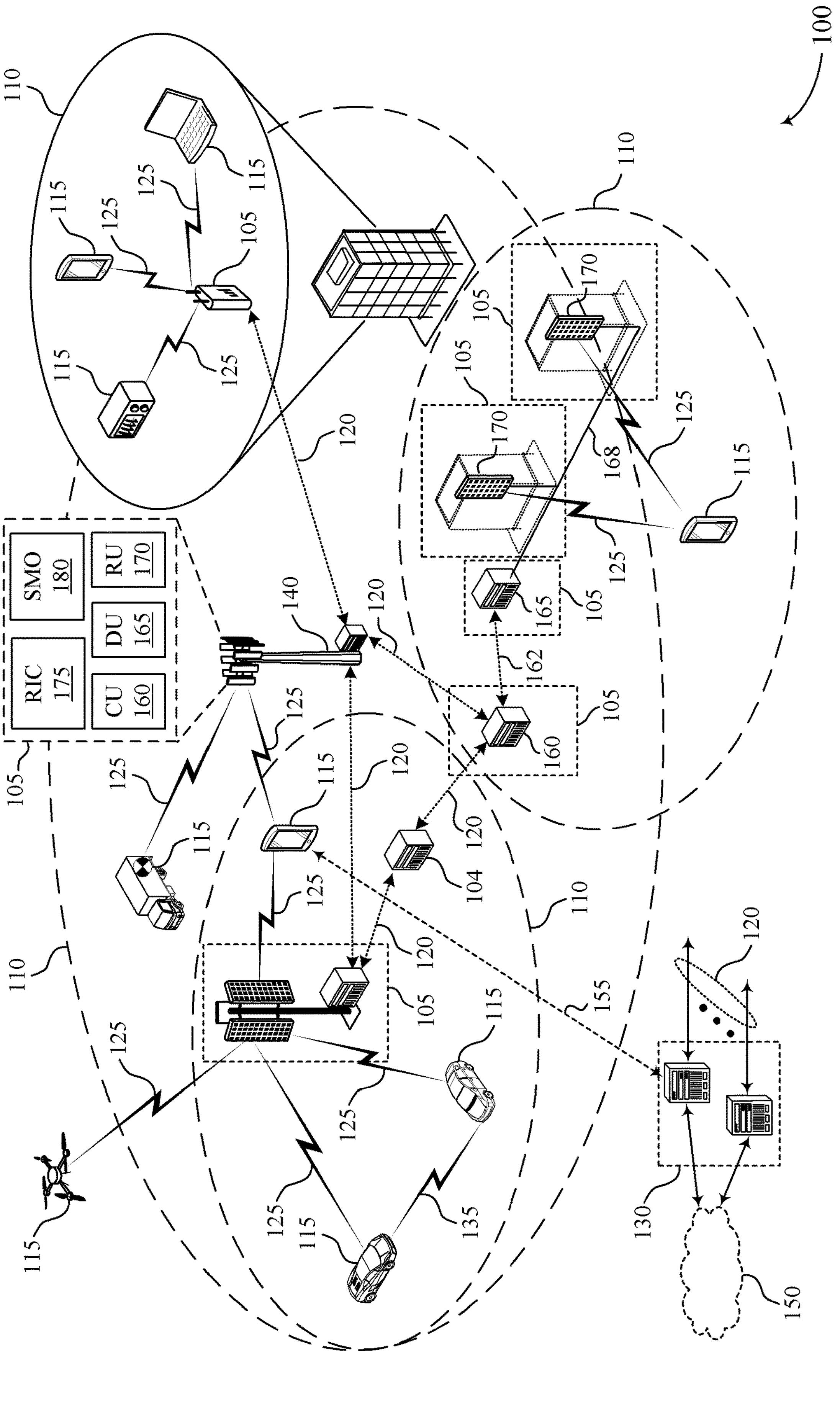
FIGS. 1 and 2 illustrate examples of wireless communications systems that support a personal Internet of Things (IoT) network (PIN) architecture in accordance with one or more aspects of the present disclosure.

In some wireless communications systems, a communication device such as a user equipment (UE) may access a network of a wireless communications system, for example, over a radio access network (RAN) (e.g., via a network entity of the wireless communications system, via an access link such as a Uu link). In some cases, some wireless devices, such as a non-cellular capable wireless device, a non-Third Generation Partnership Project (3GPP) device, or a WIFI and/or Bluetooth exclusive device, may not support communications over the RAN and may thus be unable to access the network. To support communications between such wireless devices and the network, a personal Internet of Things (IoT) network (PIN) may be configured (e.g., established). In some examples, a PIN may additionally or alternatively support the personal management of a network of devices, such as IoT devices, by a network node, such as UE, among other benefits and purposes of a PIN.

A PIN may be a configured and managed group of at least one at least one PIN element with gateway capability (PEGC) and at least one PIN element (PINE) that support communicating with each other and with a network (e.g., a fifth generation (5G) network) via a PEGC. For instance, a PINE may be a non-cellular wireless device that does not support directly accessing the network over a RAN but may communicate with the network via a PEGC. The PIN may additionally include a PIN element with management capability (PEMC) that may manage the PIN and the devices therein. However, details and information related to entities and functions within or associated with the network that manage and support PIN creation and operation may be unknown. In other words, an architecture for supporting communications between the network and PIN nodes may be unknown, and thus, communications between the network and the PIN nodes may not be supported.

Techniques, systems, and devices are described herein to support a PIN architecture that enables the configuration, operation, and management of a PIN such that communications between a network and PIN nodes are supported. For example, the PIN may include a PIN application server that is configured to communicate with the network (e.g., with one or more network functions of the network), such as a 5G core (5GC). For instance, the PIN application server may interface with one or more network functions, which may enable the PIN application server to register and manage nodes within the PIN, such as PEMCs, PEGCs, and PINEs included in the PIN. Supporting the registration of PIN nodes with the network may enable the PIN nodes to access the network. As a result, non-cellular PINEs may be able to access the network via a PEGC of the PIN.

The PIN application server may receive information from a PEMC via a user plane of the network that triggers (e.g., requests for) the PIN application server to establish the PIN. To establish the PIN, the PIN application server may access the network to determine whether the creation of the PIN is authorized, for example, based on identification information corresponding to the PEMC. If authorized, the PIN application server may establish and configure the PIN. For example, the PIN application server may identify and register nodes of the PIN. The PIN application server may identify respective functions of the nodes (e.g., whether a node is a PEGC, a PEMC, or a PINE) and transmit information to the respective nodes that identifies and configures the node in accordance with its function. The PEMC may manage the PIN, for example, by managing the modification, deletion, activation, or deactivation of the PIN, among other operations described herein. The PEGC may support the relaying of messages between PINEs and between a PINE and the network, among other operations described herein. Thus, a PIN architecture including a PIN application server may support the configuration, operation, and management of a PIN.

Aspects of the disclosure are initially described in the context of wireless communications systems. Aspects of the disclosure are additionally described in the context of a process flow. Aspects of the disclosure are further illustrated by and described with reference to apparatus diagrams, system diagrams, and flowcharts that relate to a PIN architecture.

FIG. 1 illustrates an example of a wireless communications system 100 that supports a PIN architecture in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115 or network entities 105, as shown in FIG. 1.

As described herein, a node, which may be referred to as a node, a network node, a network entity, or a wireless node, may be a base station 140 (e.g., any base station described herein), a UE 115 (e.g., any UE 115 described herein), a network controller, an apparatus, a device, a computing system, one or more components, and/or another suitable processing entity configured to perform any of the techniques described herein. For example, a network node may be a UE 115. As another example, a network node may be a base station 140. As another example, a first network node may be configured to communicate with a second network node or a third network node. In one aspect of this example, the first network node may be a UE 115, the second network node may be a base station 140, and the third network node may be a UE 115. In another aspect of this example, the first network node may be a UE 115, the second network node may be a base station 140, and the third network node may be a base station 140. In yet other aspects of this example, the first, second, and third network nodes may be different relative to these examples. Similarly, reference to a UE 115, base station 140, apparatus, device, computing system, or the like may include disclosure of the UE 115, base station 140, apparatus, device, computing system, or the like being a network node. For example, disclosure that a UE 115 is configured to receive information from a base station 140 also discloses that a first network node is configured to receive information from a second network node. Consistent with this disclosure, once a specific example is broadened in accordance with this disclosure (e.g., a UE 115 is configured to receive information from a base station 140 also discloses that a first network node is configured to receive information from a second network node), the broader example of the narrower example may be interpreted in the reverse, but in a broad open-ended way. In the example above where a UE 115 being configured to receive information from a base station 140 also discloses that a first network node being configured to receive information from a second network node, the first network node may refer to a first UE 115, a first base station 140, a first apparatus, a first device, a first computing system, a first one or more components, a first processing entity, or the like configured to receive the information; and the second network node may refer to a second UE 115, a second base station 140, a second apparatus, a second device, a second computing system, a first one or more components, a first processing entity, or the like.

As described herein, communication of information (e.g., any information, signal, or the like) may be described in various aspects using different terminology. Disclosure of one communication term includes disclosure of other communication terms. For example, a first network node may be described as being configured to transmit information to a second network node. In this example and consistent with this disclosure, disclosure that the first network node is configured to transmit information to the second network node includes disclosure that the first network node is configured to provide, send, output, communicate, or transmit information to the second network node. Similarly, in this example and consistent with this disclosure, disclosure that the first network node is configured to transmit information to the second network node includes disclosure that the second network node is configured to receive, obtain, or decode the information that is provided, sent, output, communicated, or transmitted by the first network node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another over a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 through a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 175 is flexible and may support different functionalities depending upon which functions (e.g., network layer functions, protocol layer functions, baseband functions, RF functions, and any combinations thereof) are performed at a CU 160, a DU 165, or an RU 175. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication over such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115)

within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support personal internet of things network architecture as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) over one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both) such that the more resource elements that a device receives and the higher the order of the modulation scheme, the higher the data rate may be for the device. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max}\cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be able to communicate directly with other UEs 115 over a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by or scheduled by the network entity 105. In some examples, one or more UEs 115 in such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without the involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, which may be referred to as clusters, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. While operating in unlicensed RF spectrum bands, devices such as the network entities 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located in diverse geographic locations. A network entity 105 may have an antenna array with a set of rows and columns of antenna ports that the network entity 105 may use to support beamforming of communications with a UE 115. Likewise, a UE 115 may have one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or PDCP layer may be IP-based. An RLC layer may perform packet segmentation and reassembly to communicate over logical channels. A MAC layer may perform priority handling and multiplexing of logical channels into transport channels. The MAC layer may also use error detection techniques, error correction techniques, or both to support retransmissions at the MAC layer to improve link efficiency. In the control plane, the RRC protocol layer may provide establishment, configuration, and maintenance of an RRC connection between a UE 115 and a network entity 105 or a core network 130 supporting radio bearers for user plane data. At the PHY layer, transport channels may be mapped to physical channels.

The wireless communications system 100 may support access of the core network 130 by non-cellular devices (e.g., non-3GPP devices) by utilizing a PIN. For example, a PIN may include one or more PINEs that are non-cellular devices and thus incapable of directly accessing the core network 130. The PIN may include a PEGC, which may be an example of UE 115 that is capable of relaying communications between a PINE of the PIN and the core network 130. For example, the PEGC may have both non-cellular and cellular capabilities that enable the PEGC to relay the communications between the PINE and the core network 130. The PIN may also include a PEMC, which may be an example of a UE 115 (e.g., a same UE 115 configured as the PEGC, a different UE 115 from the UE 115 configured as the PEGC) that is capable of managing the PIN, for example, by managing the addition and deletion of nodes from the PIN, among other management operations supported by the PEMC. In some examples, nodes included in the PIN may be network nodes of the PIN, and nodes outside of the PIN may be network nodes associated with the core network 130.

To support configuration, operation, and management of the PIN, a PIN architecture may include a PIN application server that communicates with one or more entities (e.g., functions) of the core network 130 and one or more PIN nodes and may perform management operations for the PIN such that access to the core network 130 may be supported. For example, the PIN application server may receive, via a user plane entity (e.g., a user plane function (UPF)), information from a first network node that triggers the PIN application server to establish the PIN. To establish the PIN, the PIN application server may identify and register the first network node as a PEMC of the PIN, a second network node as a PEGC of the PIN, and one or more non-cellular devices as PINEs of the PIN. Registration of the PIN nodes may enable the PIN nodes to access the core network 130, for example, via the user plane entity. Accordingly, a PINE included in the PIN may be able to communicate with the core network 130 via the PEGC (e.g., despite being a non-cellular device).

Figure 2:
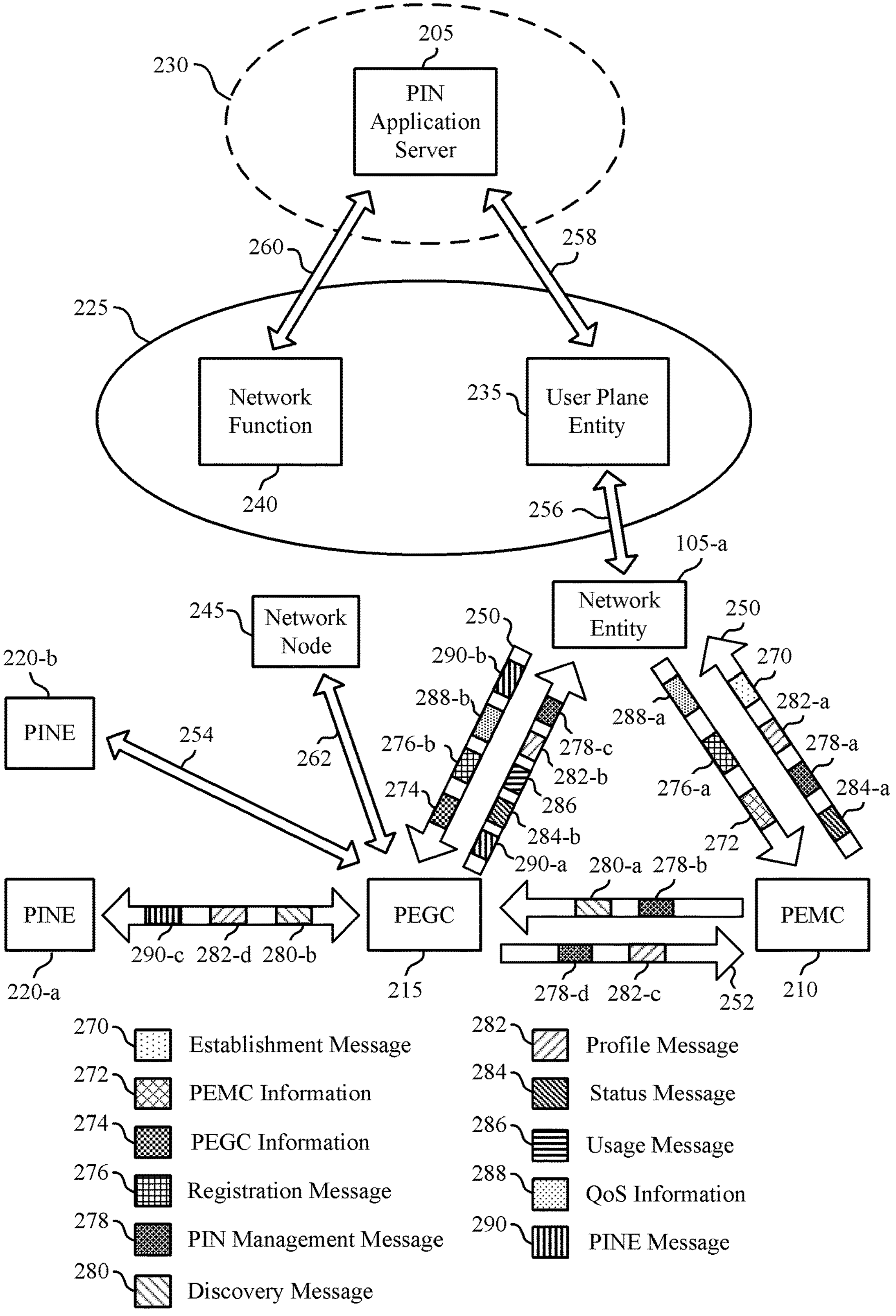

FIG. 2 illustrates an example of a wireless communications system 200 that supports a PIN architecture in accordance with one or more aspects of the present disclosure. The wireless communications system 200 may implement or be implemented by aspects of the wireless communications system 100 described with reference to FIG. 1. For example, the wireless communications system 200 may include a network entity 105-*a*, a PIN application server 205, a PEMC 210, a PEGC 215, a PINE 220-*a*, and PINE 220-*b*, which may be examples of the corresponding aspects described with reference to FIG. 1. The wireless communications system 200 may support the management and operation of a PIN, which may provide network access to non-cellular devices, among other benefits.

The wireless communications system 200 may support communications between various nodes of the wireless communications system 200. For example, the wireless communications system 200 may support communications between the PEMC 210 and the network entity 105-*a* and between the PEGC 215 and the network entity 105-*a* over respective communication links 250. In some examples, the PEMC 210 and the PEGC 215 may be examples of a UE 115 described herein, and the communication links 250 may be examples of a communication link 125 described with reference to FIG. 1 (e.g., Uu links). The wireless communications system 200 may also support communications between the PEMC 210 and the PEGC 215 over respective communication links 252. In some examples, the communication links 252 may be examples of a non-cellular communication link, such as WIFI or Bluetooth communications links. In some other example, the communication links 252 may be examples of a D2D communication link 135 described with reference to FIG. 1 (e.g., a 5G ProSe direct communication link). In some examples, the PEMC 210 and the PEGC 215 may be a same node (e.g., a same UE 115).

The wireless communications system 200 may also support communications between the PEGC 215 and PINEs 220 over respective communication links 254. For example, the PEGC 215 may communicate with the PINE 220-*a* and the PINE 220-*b* over respective communication links 254. In some examples, the communication links 254 may be examples of a non-cellular communication link. For example, the PINE 220-*a* and the PINE 220-*b* may be non-cellular devices (e.g., non-cellular IoT devices), and the PEGC 215 may have non-cellular communication capabilities that enable the PEGC 215 and the PINEs 220 to communicate.

The wireless communications system 200 may additionally support communications between the network entity 105-*a* and a network 225, which may be an example of a 5GC or a core network 130 as described with reference to FIG. 1. For example, the network entity 105-*a* may communicate with the network 225 over a backhaul communication link 256, which may be an example of a backhaul communication link 120 described with reference to FIG. 1. The network 225 may include a user plane entity 235, such as a UPF, that provides an interconnection between the network 225 and a data network 230 (e.g., IP services 150 described with reference to FIG. 1). For example, the PIN application server 205 may be included in the data network 230, and communications between the network entity 105-*a* and the PIN application server 205 may be routed through the user plane entity 235. For instance, the PIN application server 205 and the user plane entity 235 may communicate over a communication link 258, and the network entity 105-*a* and the user plane entity 235 may communicate over the backhaul communication link 256. Accordingly, the network entity 105-*a* and the PIN application server 205 may communicate via the user plane entity 235.

The network 225 may also include other entities and functions that interface with the PIN application server 205. For example, the network 225 may include a network function 240, such as a network exposure function (NEF), a policy control function (PCF), a unified data management (UDM) function, or a unified data repository (UDR) function, with which the PIN application server 205 may communicate over a communication link 260 (e.g., an interface between the PIN application server 205 and the network function 240).

The wireless communications system 200 may support a PIN architecture that enables the establishment and management of a PIN such that PINEs 220 may communicate with the network 225, among other benefits. For example, the PIN application server 205 may operate in conjunction with the PEMC 210 and the PEGC 215 to manage (e.g., create, delete, modify, activate, deactivate) the PIN. For instance, the PEMC 210 may transmit an establishment message 270 to the PIN application server 205 that triggers the PIN application server 205 to establish the PIN (e.g., create an instance of a PIN that is registered with the network 225). The PEMC 210 may transmit the establishment message 270 via the user plane of the network 225, for example, by transmitting the establishment message 270 directly to the network entity 105-*a* or by transmitting the establishment message 270 to the PEGC 215 which may forward the establishment message 270 to the network entity 105-*a*. That is communications between the PEMC 210 and the PIN application server 205 may be routed through the PEGC 215 or directly through the network entity 105-*a*.

To establish the PIN, the PIN application server 205 may support the registration and configuration of one or more PEMCs 210, one or more PEGCs 215, and one or more PINEs 220. For example, at a time the establishment message 270 is transmitted, the PEMC 210 may operate as a network node within the wireless communications system 200. That is, the PEMC 210 may not yet be configured as (e.g., to server or operate as) a PEMC 210 of the PIN. Instead, the PIN application server 205 may interface with the network function 240 in response to reception of the establishment message 270, for example, to determine whether creation of the PIN is authorized, register the PIN with the network 225, obtain subscription and/or policy information associated with regulating communications between the network 225 and the PIN, or a combination thereof.

To further establish the PIN, the PIN application server 205 may manage the registration and modification (e.g., addition or deletion) of nodes within the PIN, for example, in conjunction with the PEMC 210. For example, the PIN application server 205 may identify the network node from which the establishment message 270 is received as the PEMC 210 and may transmit PEMC information 272 to the PEMC 210 that configures the PEMC 210. For example, the PEMC information 272 may include network management identification information that identifies the PEMC 210 as a network management element for the PIN (e.g., as a PEMC for the PIN) and network management configuration information that is indicative of a management configuration for the PEMC 210.

In some examples, the PEMC 210 may transmit a profile message 282-*a* (e.g., which may be included in or separate from the establishment message 270) that includes a profile including at least one of capability information of the PEMC 210 or an identifier of the PEMC 210 for association with the PIN. For example, the capability information may indicate that the PEMC 210 supports management of the PIN (e.g., operating as a PEMC 210), the identifier may indicate that the PEMC 210 is a network node that supports management of the PIN, or a combination thereof. In some cases, the capability information may indicate a wireless communication technology capability of the PEMC 210, for example, that indicates whether a non-cellular technology is supported by the PEMC 210. In some examples, the PIN application server 205 may identify the PEMC 210 using the received profile and transmit the PEMC 210 information to configure the PEMC 210 as a PEMC of the PIN. For example, the PIN application server 205 may associate the received profile with role information indicative of a role in the PIN; the role being that of a PEMC. The PIN application server 205 may store the received profile.

The PEMC 210 may communicate with the PIN application server 205 and other nodes of the wireless communications system 200 to register additional nodes in the PIN. For example, the PEMC 210 may transmit a discovery message 280-*a* to the PEGC 215 that invites (e.g., requests for) the PEGC 215 to join the PIN. In response to the discovery message 280-*a*, the PEGC 215 may transmit a profile message 282 to the PIN application server 205 (e.g., a profile message 282-*b*) or to the PEMC 210 (e.g., a profile message 282-*c*) that the PEMC 210 may forward to the PIN application server 205. The profile message 282 may include a profile of the PEGC 215 that includes capability information of the PEGC 215, an identifier of the PEGC 215 for association with the PIN, or a combination thereof. The capability information may indicate that the PEGC 215 supports gateway functionality for the PIN (e.g., operating as a PEGC 215), the identifier may indicate that the PEGC 215 is a network node that supports gateway functionality, or a combination thereof. In some cases, the capability information may indicate a wireless communication technology capability of the PEGC 215, for example, that indicates that a non-cellular technology is supported by the PEMC 210.

At a time of the communication of the discovery message 280-*a* and the profile message 282, the PEGC 215 may operate as a network node within the wireless communications system 200 that is not yet configured as a PEGC 215. In some examples, the transmission of the profile message 282 may indicate acceptance of the invitation to join the PIN. The PIN application server 205 may receive and store the profile of the PEGC 215 and register the PEGC 215 as a PEGC of the PIN based on the profile of the PEGC 215. For example, the PIN application server 205 may associate the profile of the PEGC 215 with role information indicative of a role in the PIN; the role being that of a PEGC. In response to (e.g., after) registering the PEGC 215 in the PIN (e.g., adding the PEGC 215 to the PIN), the PIN application server 205 may transmit PEGC information 274 to the PEGC 215 that configures the PEGC 215. For example, the PEGC information 274 may include network gateway identification information that identifies the PEGC 215 as a network gateway for the PIN (e.g., as a PEGC for the PIN) and gateway configuration information that is indicative of a gateway configuration for the PEGC 215. In some examples, if the PEGC 215 is not authorized to join the PIN (e.g., based on policy or subscription information obtained from the network 225 corresponding to the PEGC 215), the PIN application server 205 may indicate to the PEMC 210 that the PEGC 215 is denied from joining the PIN.

The PEMC 210 may further support the addition of PINEs 220 to the PIN. For example, the PEMC 210 may indicate for the PEGC 215 to communicate discovery signaling with one or more PINEs 220 that invites the PINEs 220 to join the PIN. For instance, the PEGC 215 may transmit a discovery message 280-*b* to the PINE 220-*a* that invites the PINE 220-*a* to join the PIN. In response to the discovery message 280-*b*, the PINE 220-*a* may transmit a profile message 282-*d* to the PEGC 215, which may forward the profile message 282-*d* to the PIN application server 205 via the PEMC 210 or the network entity 105-*a*. The profile message 282-*d* may include a profile of the PINE 220-*a* that includes capability information of the PINE 220-*a*, an identifier of the PINE 220-*a* for association with the PIN, or a combination thereof. In some examples, the capability information or the identifier of the PINE 220-*a* may indicate that it is a PINE. For example, the capability information may indicate (e.g., or the identifier of the PINE 220-*a* may be indicative of) a wireless communication technology capability of the PINE 220-*a*, for example, that indicates that a non-cellular technology is supported by the PINE 220-*a* and that a cellular technology is not supported by the PINE 220-*a*.

In some examples, the transmission of the profile message 282-*d* may indicate acceptance of the invitation to join the PIN. The PIN application server 205 may receive and store the profile of the PINE 220-*a* and register the PINE 220-*a* as a PINE of the PIN based on the profile of the PINE 220-*a*. For example, the PIN application server 205 may associate the profile of the PINE 220-*a* with role information indicative of a role in the PIN; the role being that of a PINE.

In some examples, the PEMC 210 and the PEGC 215 may communicate discovery signaling for adding nodes to the PIN in accordance with registration information or management policy information provided by the PIN application server 205. For example, the PIN application server 205 may transmit a registration message 276 to the PEMC 210 (e.g., a registration message 276-*a*) and/or the PEGC 215 (e.g., a registration message 276-*b*) that enables nodes to join the PIN. For example, the registration message 276 may include registration information or management policy information that indicates information to gather from (e.g., request from) nodes such that registration and role association may be performed by the PIN application server 205. Accordingly, the registration information or the management policy information may enable the addition of nodes to the PIN that may operate as a PEMC 210 (e.g., an additional PEMC 210), a PEGC 215 (e.g., the PEGC 215, an additional PEGC 215), or a PINE 220.

The PEMC 210 may support the modification of the PIN, for example, by also supporting the removal of PIN nodes from the PIN. For example, the PEMC 210 may transmit a PIN management message 278 that indicates removal of a PIN node from the PIN. For instance, the PEMC 210 may transmit a PIN management message 278-*a* to the PIN application server 205 that indicates removal of one or more of the PIN nodes (e.g., the PEGC 215, the PINE 220-*a*, the PINE 220-*b*) from the PIN. In response, the PIN application server 205 may remove (e.g., deregister) the indicated PIN node from the PIN. Additionally or alternatively, the PEMC 210 may transmit a PIN management message 278-*b* to the PEGC 215 that indicates removal of the PEGC 215 or a PINE 220 from the PIN. If the PEGC 215 indicates removal of a PINE 220 from the PIN, the PEGC 215 may forward the PIN management message 278-*b* to the corresponding PINE 220 to remove the PINE 220 from the PIN. In some examples, the PEGC 215 may transmit a PIN management message 278 to the PIN application server 205 (e.g., a PIN management message 278-*c*) and/or to the PEMC 210 (e.g., a PIN management message 278-*d*) that confirms removal of the PINE 220 from the PIN. In some other examples, the PIN management message 278 transmitted by the PEGC 215 may indicate an addition of the PINE 220 to the PIN (e.g., in response to a discovery message 280-*a*).

The PIN application server 205 may store context data of the PIN that indicates how the PIN nodes are interconnected. For example, the PIN application server 205 may store context data that indicates to which other PIN node(s) each PIN node is connected. For instance, in the example of FIG. 2, the context data may indicate that the PEMC 210 is connected with (e.g., communicates with) the PEGC 215 and that the PEGC 215 is connected with the PINE 220-*a* and the PINE 220-*b*. In some examples, the PIN application server 205 may store and update the context data of the PIN as nodes are added to or removed from the PIN.

The PIN application server 205 may store status information of the PIN. For example, the PIN application server 205 may store status information indicating whether the PIN is activated or deactivated. Additionally, or alternatively, the PIN application server 205 may store status information indicating whether individual PIN nodes are activated or deactivated. For example, the PEMC 210 may support the activation and deactivation of the PIN, the activation and deactivation of individual PIN nodes, or a combination thereof. For instance, to avoid deletion of the PIN and the signaling and time associated with subsequently recreating (e.g., reestablishing) the PIN, the PIN may instead be activated and deactivated. As a result, registration information and stored profiles may be maintained rather than deleted, which may reduce latency associated with reestablishing the PIN while supporting time periods for which the PIN may be active.

To communicate the status information, the PEMC 210 may transmit a status message 284-*a* to the PIN application server 205. In some examples, the status message 284-*a* may indicate whether the PIN is activated or deactivated. In some examples, the status message 284-*a* may request for the PIN to be activated or deactivated (e.g., trigger activation or deactivation of the PIN). In some cases, the status message 284-*a* may indicate an activated or deactivated status of the PEGC 215 or a PINE 220 of the PIN. In some examples, the PEGC 215 may transmit a status message 284-*b* to the PIN application server 205 (e.g., or the PEMC 210) that indicates the activated or deactivated status of the PEGC 215 or the PINE 220.

In some examples, the status of the PIN or the PIN nodes may be based on a time validity that is managed by the PEMC 210. For example, the PIN or one or more PIN nodes may be configured with a period of time for which the PIN or the one or more PIN nodes are valid. That is, the period of time may correspond to a duration for which the PIN is activated or authorized to support communications with the network 225. Additionally or alternatively, the period of time may correspond to a duration for which the one or more PIN nodes are activated or authorized to communicate with the network 225. In some examples, the status message 284-*a* may indicate time validity information associated with the PIN or the one or more PIN nodes or a change (e.g., a request for a change) to the time validity information.

In some examples, the PEMC 210 may communicate with the PIN application server 205 to delete the PIN. For example, the status message 284-*a* may request for the PIN application server 205 to delete the PIN. In response, the PIN application server 205 may delete the stored profiles of the PIN nodes and delete the registration of the PIN with the network 225.

As a result of the establishment and configuration of the PIN, the PIN may support communications between the PINEs 220 and the network 225 and between respective PINEs 220. For example, the PEGC 215 may support the communication of PINE messages 290 between a PINE 220 and the network 225, between respective PINEs 220, or both. In some examples, a PINE message 290 may be a data message. The PEGC 215 may relay (e.g., transmit) a PINE message 290-*a* to the network 225 (e.g., via the network entity 105-*a*) received from, for example, the PINE 220-*a*. Additionally or alternatively, the PEGC 215 may relay a PINE message 290-*b* to, for example, the PINE 220-*a* received from the network 225. In some examples, to support the relaying of the PINE message 290-*b* to the PINE 220-*a*, the PEGC 215 may establish a downlink path for PINE messages 290 to the PINE 220-*a*. Additionally or alternatively, the PEGC 215 may relay a PINE message 290-*c* between the PINE 220-*a* and the PINE 220-*b* (e.g., from the PINE 220-*b* to the PINE 220-*a*, or vice versa).

In some examples, the PEGC 215 may provision resources to enable PINE-to-PINE communications. For example, the PEGC 215 may provision and allocate resources to the PINE 220-*a* and the PINE 220-*b* such that the PINE 220-*a* and the PINE 220-*b* may communicate PINE messages 290 directly.

In some examples, communications relayed by the PEGC 215 may be relayed in accordance with one or more security protocols. For example, the communications may be encrypted with an encryption key, among other security functions that may be supported by the PEGC 215.

In some examples, communication of PINE messages 290 may be based on quality of service (QoS) control information transmitted by the PIN application server 205. For example, the PIN application server 205 may transmit QoS information 288 that indicates QoS control information according to which the PINE messages 290 are to be communicated. For instance, the QoS control information may indicate QoS parameters for communicating the PINE messages 290.

In some examples, access between the PIN and the network 225 may be regulated by at least one of a subscription or a policy communicated between the network function 240 and the PIN application server 205. For example, the PIN application server may access a PCF, a UDM, or a UDR (e.g., via an NEF) to obtain subscription or policy information associated with one or more of the PIN nodes (e.g., the PEMC 210, the PEGC 215, a PINE 220). The data and information communicated between the network 225 and respective PIN nodes of the PIN may be in accordance with the obtained subscription or policy information.

The PIN application server 205 may collect network usage information pertaining to use of the PIN by one or more of the PIN nodes of the PIN. For example, the PIN application server 205 may collect usage information that indicates how much one or more of the PEMC 210, the PEGC 215, the PINE 220-*a*, and the PINE 220-*b* use the PIN. In some examples, the PIN application server 205 may collect the usage information based on a usage message 286. For example, the PEGC 215 may transmit the usage message 286 to the PIN application server 205 that includes a report of the usage of the PIN by one or more of the PEMC 210, the PEGC 215, the PINE 220-*a*, and the PINE 220-*b*. In some examples, the usage information may include billing information pertaining to the use of the PIN. For example, the billing information may include monetary or service information related to services of the PIN that may support a provider to charge a customer in accordance with the services rendered.

In some examples, the PEGC 215 may manage traffic routing for network nodes of the wireless communications system 200 that are unable to join or not present in the PIN. For example, the PEGC 215 may communicate with a network node 245 over a communication link 262, which may be an example of a cellular or non-cellular communication link. The network node 245 may be excluded from the PIN. That is, the network node 245 may be unable to join or not yet registered in (e.g., added to) the PIN. In some examples, the PEGC 215, independent of the PIN, may manage traffic routing for communications between the network node 245 and additional network nodes 245, between the network node 245 and the network 225, or both.

Figure 3:
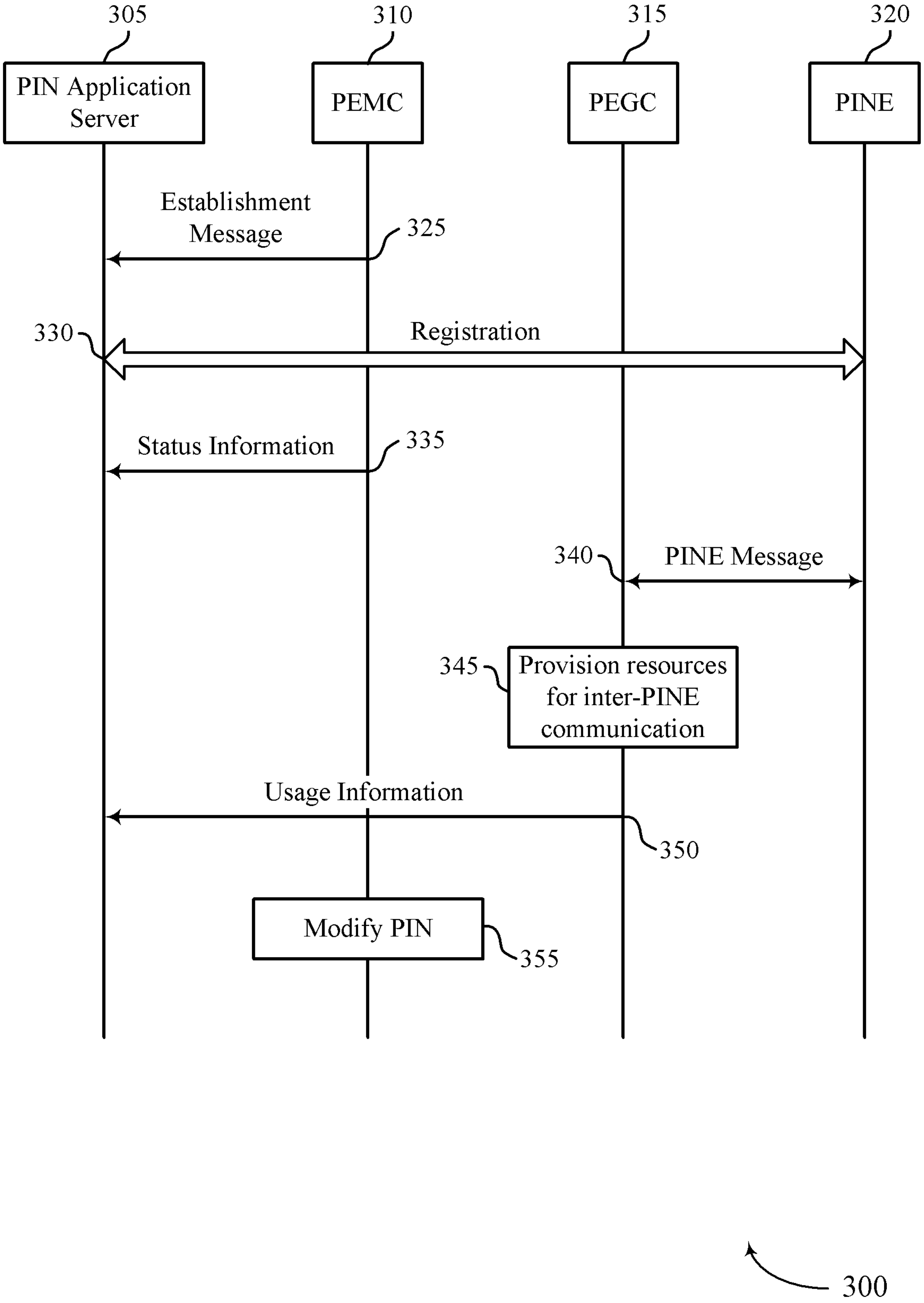
FIG. 3 illustrates an example of a process flow that supports a PIN architecture in accordance with one or more aspects of the present disclosure.

FIG. 3 illustrates an example of a process flow 300 that supports a PIN architecture in accordance with one or more aspects of the present disclosure. The process flow 300 may implement or may be implemented by aspects of the wireless communications systems 100 and 200 as described with reference to FIGS. 1 and 2, respectively. For example, the process flow 300 may be implemented by a PIN application server 305, a PEMC 310, a PEGC 315, and a PINE 320 to support the configuration and management of a PIN.

The PIN application server 305, the PEMC 310, the PEGC 315, and the PINE 320 may each be examples of the corresponding devices as respectively described herein, including with reference to FIGS. 1 and 2. In the following description of the process flow 300, the operations may be performed in different orders or at different times. Some operations also may be omitted from the process flow 300, and other operations may be added to the process flow 300. Further, although some operations or signaling may be shown to occur at different times for discussion purposes, these operations may actually occur at the same time.

At 325, the PEMC 310 may transmit an establishment message to the PIN application server 305 that triggers establishment of a PIN. For example, the establishment message may trigger the PIN application server 305 to initiate the creation and registration of the PIN. The PEMC 310 may transmit the establishment to the PIN application server 305 via a user plane of a network, such as via a UPF of a 5GC. In some examples, the PIN application server 305 may communicate with the network to determine whether creation of the PIN is authorized. If the PIN is authorized, the PIN application server 305 may create and register the PIN, which may include the creation and registration of an identifier of the PIN.

At 330, nodes may be registered in the PIN. For example, the PEMC 310 may transmit information, such as a profile of the PEMC 310, to the PIN application server 305 via the user plane that enables the PIN application server 305 to register the PEMC 310 in the PIN and assign the PEMC 310 to operate as a network management element (e.g., a PEMC) within the PIN. In some examples, the profile of the PEMC 310 may be included in the establishment message.

After registration of the PEMC 310, the PEMC 310 may aid in the registration and addition of the PEGC 315 to the PIN. For example, the PEMC 310 may invite the PEGC 315 to join the PIN, for example, by transmitting a discovery message to the PEGC 315. In response to the invitation, the PEGC 315 may transmit information, such as a profile of the PEGC 315, to the PIN application server 305 (e.g., via the PEMC 310) that enables the PIN application server 305 to register the PEGC 315 in the PIN and assign the PEGC 315 to operate as a network gateway (e.g., a PEGC) within the PIN.

The PIN application server 305 may transmit information to the PEMC 310 and the PEGC 315 that identifies and configures the PEMC 310 and the PEGC 315. For example, the PIN application server 305 may transmit PEMC information that includes network management identification information that identifies the PEMC 310 as a network management element for the PIN and network management configuration information that is indicative of a management configuration for the PEMC 310. Additionally, the PIN application server 305 may transmit PEGC information that includes network gateway identification information that identifies the PEGC 315 as a network gateway for the PIN and gateway configuration information that is indicative of a gateway configuration for the PEGC 315.

The PEMC 310 may also support the registration and addition of PINEs to the PIN. For example, the PEMC 310 may invite the PINE 320 to join the PIN. In some examples, the PEMC 310 may in invite the PINE 320 by transmitting a discovery message to the PINE 320 via the PEGC 315. In response, the PINE 320 may transmit information, such as a profile of the PINE 320, to the PIN application server 305 via the PEGC 315 that enables the PIN application server 305 to register the PINE 320 in the PIN and assign the PINE 320 to operate as a PINE within the PIN.

At 335, the PEMC 310 may transmit status information to the PIN application server 305. In some examples, the status information may indicate a status of the PIN (e.g., an activated status, a deactivated status), a status of one or more of the PEMC 310, the PEGC 315, or the PINE 320, or both. In some examples, the status information may indicate time validity information of the PIN or one or more PIN nodes. The time validity information may indicate a time period for which the PIN or the one or more PIN nodes is activated. In some examples, the status information may include a request to update or changes a status of the PIN or the one or more PIN nodes.

At 340, the PEGC 315 may relay a PINE message between the PINE 320 and the network or between the PINE 320 and another PINE 320 in the PIN. For example, based on the registration of the PEGC 315 and the PINE 320 to the PIN, the PEGC 315 may be able to (e.g., authorized to) relay communications, such as data communications (e.g., PINE messages) between the network and the PINE 320. Additionally or alternatively, the PEGC 315 may be able to relay communications between different PINEs 320 of the PIN.

At 345, the PEGC 315 may provision resources for inter-PINE communications. For example, the PEGC 315 may provision and allocate resources to the PINE 320 and an additional PINE 320 of the PIN that enables the PINE 320 and the additional PINE 320 to directly communicate a PINE message (e.g., via a non-cellular technology).

At 350, the PEGC 315 may transmit usage information to the PIN application server 305. For example, the PEGC 315 may track the usage of the PIN by one or more of the PIN nodes and may transmit a report of the usage of the PIN to the PIN application server 305. Such usage information may enable a provider to bill (e.g., charge) a customer for services rendered. For example, the usage information may include billing information that indicates services of the PIN used by individual PIN nodes which a provider may use to accurately bill a user of the PIN node.

At 355, the PEMC 310 may support modification of the PIN. For example, the PEMC 310 may support the removal of one or more PIN nodes from the PIN. In some examples, the PEMC 310 may transmit a PIN management message to the PIN application server 305 that indicates for the PIN application server 305 to remove (e.g., deregister) one or more PIN nodes from the PIN. In some examples, the PEMC 310 may transmit the PIN management message to the one or more PIN nodes (e.g., via the PEGC 315) to indicate the removal of the one or more PIN nodes from the PIN. In some examples, the PEMC 310 may support the addition of one or more additional PIN nodes, such as the addition of one or more additional PEMCs 310, PEGCs 315, or PINEs 320. In some examples, the PEMC 310 may request that the PIN be deleted. For example, the PEMC 310 may transmit a PIN management message to the PIN application server 305 that requests for (e.g., triggers) the PIN application server 305 to delete the PIN. In response, the PIN application server 305 may delete the PIN.

Figure 4:
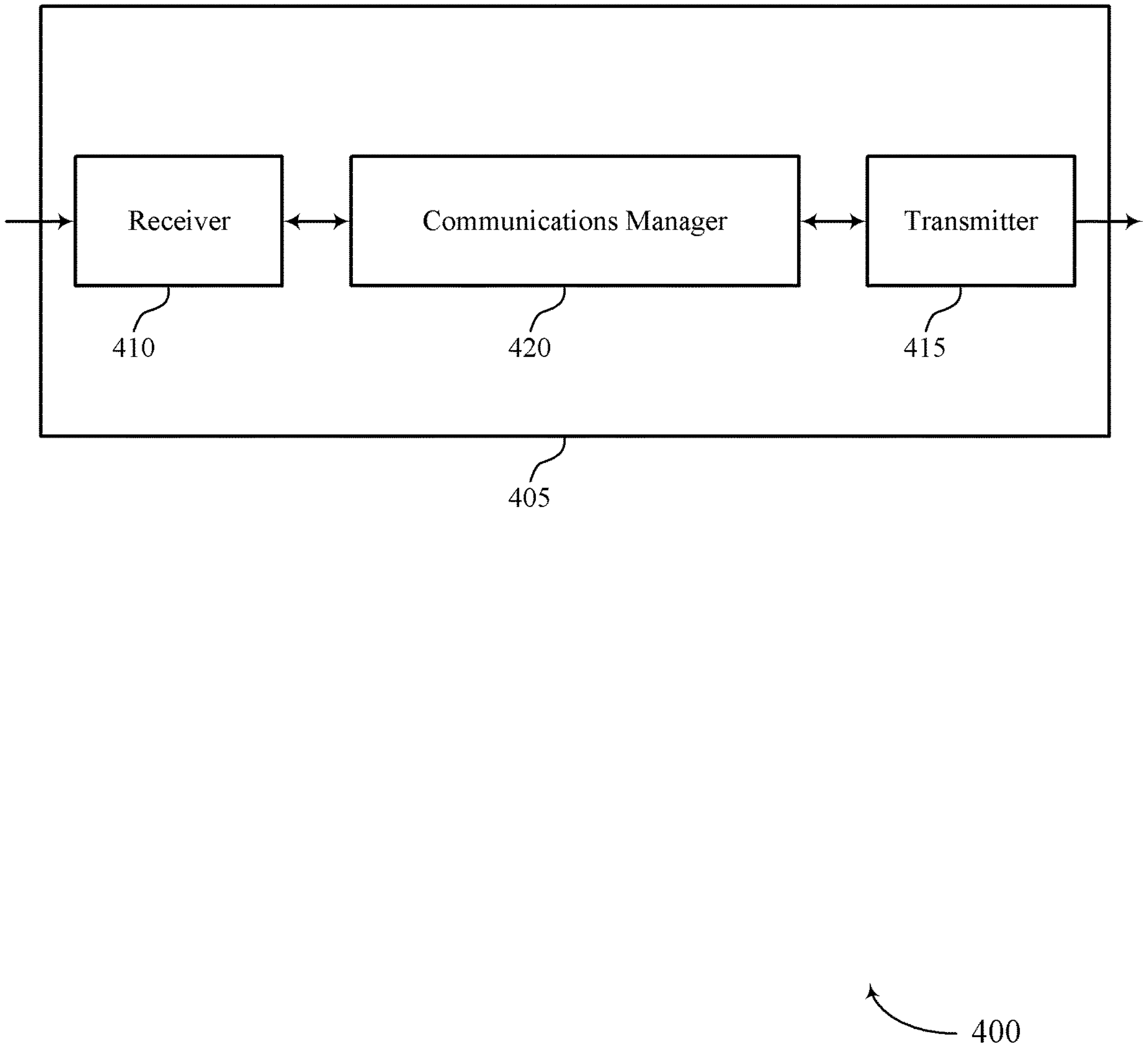
FIGS. 4 and 5 show block diagrams of devices that support a PIN architecture in accordance with one or more aspects of the present disclosure.

FIG. 4 shows a block diagram 400 of a device 405 that supports a PIN architecture in accordance with one or more aspects of the present disclosure. The device 405 may be an example of aspects of a PIN application server or a network entity 105 as described herein. The device 405 may include a receiver 410, a transmitter 415, and a communications manager 420. The device 405 may also include a processor. Each of these components may be in communication with one another (e.g., via one or more buses).

The receiver 410 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 405. In some examples, the receiver 410 may support obtaining information by receiving signals via one or more antennas. Additionally, or alternatively, the receiver 410 may support obtaining information by receiving signals via one or more wired (e.g., electrical, fiber optic) interfaces, wireless interfaces, or any combination thereof.

The transmitter 415 may provide a means for outputting (e.g., transmitting, providing, conveying, sending) information generated by other components of the device 405. For example, the transmitter 415 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 415 may support outputting information by transmitting signals via one or more antennas. Additionally, or alternatively, the transmitter 415 may support outputting information by transmitting signals via one or more wired (e.g., electrical, fiber optic) interfaces, wireless interfaces, or any combination thereof. In some examples, the transmitter 415 and the receiver 410 may be co-located in a transceiver, which may include or be coupled with a modem.

The communications manager 420, the receiver 410, the transmitter 415, or various combinations thereof or various components thereof may be examples of means for performing various aspects of a PIN architecture as described herein. For example, the communications manager 420, the receiver 410, the transmitter 415, or various combinations or components thereof may support a method for performing one or more of the functions described herein.

In some examples, the communications manager 420, the receiver 410, the transmitter 415, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 420, the receiver 410, the transmitter 415, or various combinations or components thereof may be implemented in code (e.g., as communications management software or firmware) executed by a processor. If implemented in code executed by a processor, the functions of the communications manager 420, the receiver 410, the transmitter 415, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 420 may be configured to perform various operations (e.g., receiving, obtaining, monitoring, outputting, transmitting) using or otherwise in cooperation with the receiver 410, the transmitter 415, or both. For example, the communications manager 420 may receive information from the receiver 410, send information to the transmitter 415, or be integrated in combination with the receiver 410, the transmitter 415, or both to obtain information, output information, or perform various other operations as described herein.

The communications manager 420 may support wireless communication at a first network node in accordance with examples as disclosed herein. For example, the communications manager 420 may be configured as or otherwise support a means for receiving first information that triggers the first network node to establish a first network that includes a second network node and one or more network elements configured to communicate with each other using a first wireless communication technology. The communications manager 420 may be configured as or otherwise support a means for transmitting, based on the first information via a user plane of a second network, second information to a second network node, where the second information includes network gateway identification information that identifies the second network node as a network gateway for the first network, where the second information includes gateway configuration information indicative of a gateway configuration for the second network node, and where the one or more network elements are configured to communicate with the second network via the second network node configured as the network gateway using a second wireless communication technology. The communications manager 420 may be configured as or otherwise support a means for transmitting, based on the first information via the user plane of the second network, third information to a third network node, where the third information includes network management identification information that identifies the third network node as a network management element for the first network, and where the third information includes network management configuration information indicative of a management configuration for the third network node.

By including or configuring the communications manager 420 in accordance with examples as described herein, the device 405 (e.g., a processor controlling or otherwise coupled with the receiver 410, the transmitter 415, the communications manager 420, or a combination thereof) may support techniques for PIN configuration, management, and operation, among other benefits.

Figure 5:
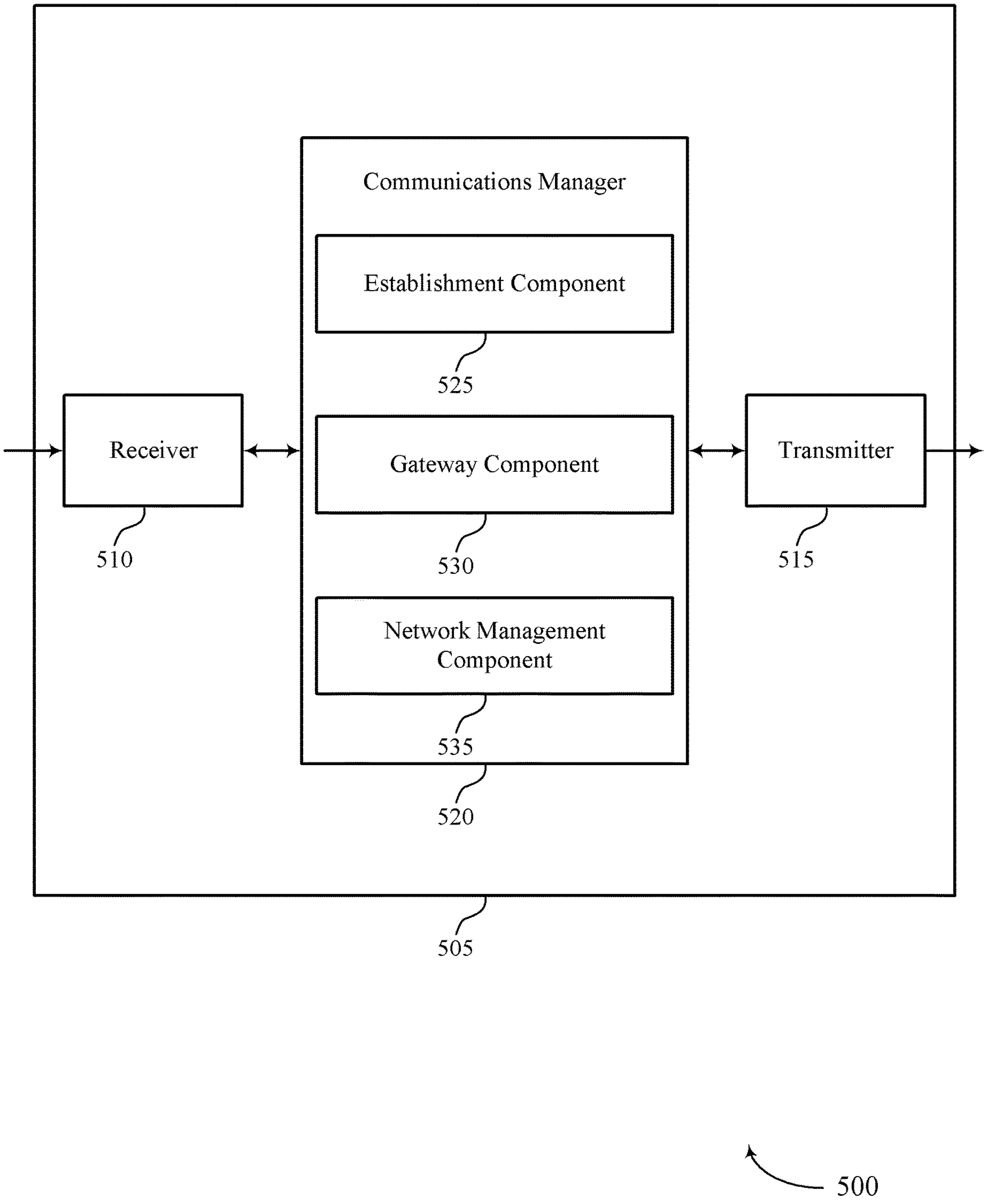

FIG. 5 shows a block diagram 500 of a device 505 that supports a PIN architecture in accordance with one or more aspects of the present disclosure. The device 505 may be an example of aspects of a device 405, a PIN application server, or a network entity 105 as described herein. The device 505 may include a receiver 510, a transmitter 515, and a communications manager 520. The device 505 may also include a processor. Each of these components may be in communication with one another (e.g., via one or more buses).

The receiver 510 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 505. In some examples, the receiver 510 may support obtaining information by receiving signals via one or more antennas. Additionally, or alternatively, the receiver 510 may support obtaining information by receiving signals via one or more wired (e.g., electrical, fiber optic) interfaces, wireless interfaces, or any combination thereof.

The transmitter 515 may provide a means for outputting (e.g., transmitting, providing, conveying, sending) information generated by other components of the device 505. For example, the transmitter 515 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 515 may support outputting information by transmitting signals via one or more antennas. Additionally, or alternatively, the transmitter 515 may support outputting information by transmitting signals via one or more wired (e.g., electrical, fiber optic) interfaces, wireless interfaces, or any combination thereof. In some examples, the transmitter 515 and the receiver 510 may be co-located in a transceiver, which may include or be coupled with a modem.

The device 505, or various components thereof, may be an example of means for performing various aspects of a PIN architecture as described herein. For example, the communications manager 520 may include an establishment component 525, a gateway component 530, a network management component 535, or any combination thereof. The communications manager 520 may be an example of aspects of a communications manager 420 as described herein. In some examples, the communications manager 520, or various components thereof, may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

The communications manager 520 may support wireless communication at a first network node in accordance with examples as disclosed herein. The establishment component 525 may be configured as or otherwise support a means for receiving first information that triggers the first network node to establish a first network that includes a second network node and one or more network elements configured to communicate with each other using a first wireless communication technology. The gateway component 530 may be configured as or otherwise support a means for transmitting, based on the first information via a user plane of a second network, second information to a second network node, where the second information includes network gateway identification information that identifies the second network node as a network gateway for the first network, where the second information includes gateway configuration information indicative of a gateway configuration for the second network node, and where the one or more network elements are configured to communicate with the second network via the second network node configured as the network gateway using a second wireless communication technology. The network management component 535 may be configured as or otherwise support a means for transmitting, based on the first information via the user plane of the second network, third information to a third network node, where the third information includes network management identification information that identifies the third network node as a network management element for the first network, and where the third information includes network management configuration information indicative of a management configuration for the third network node.

Figure 6:
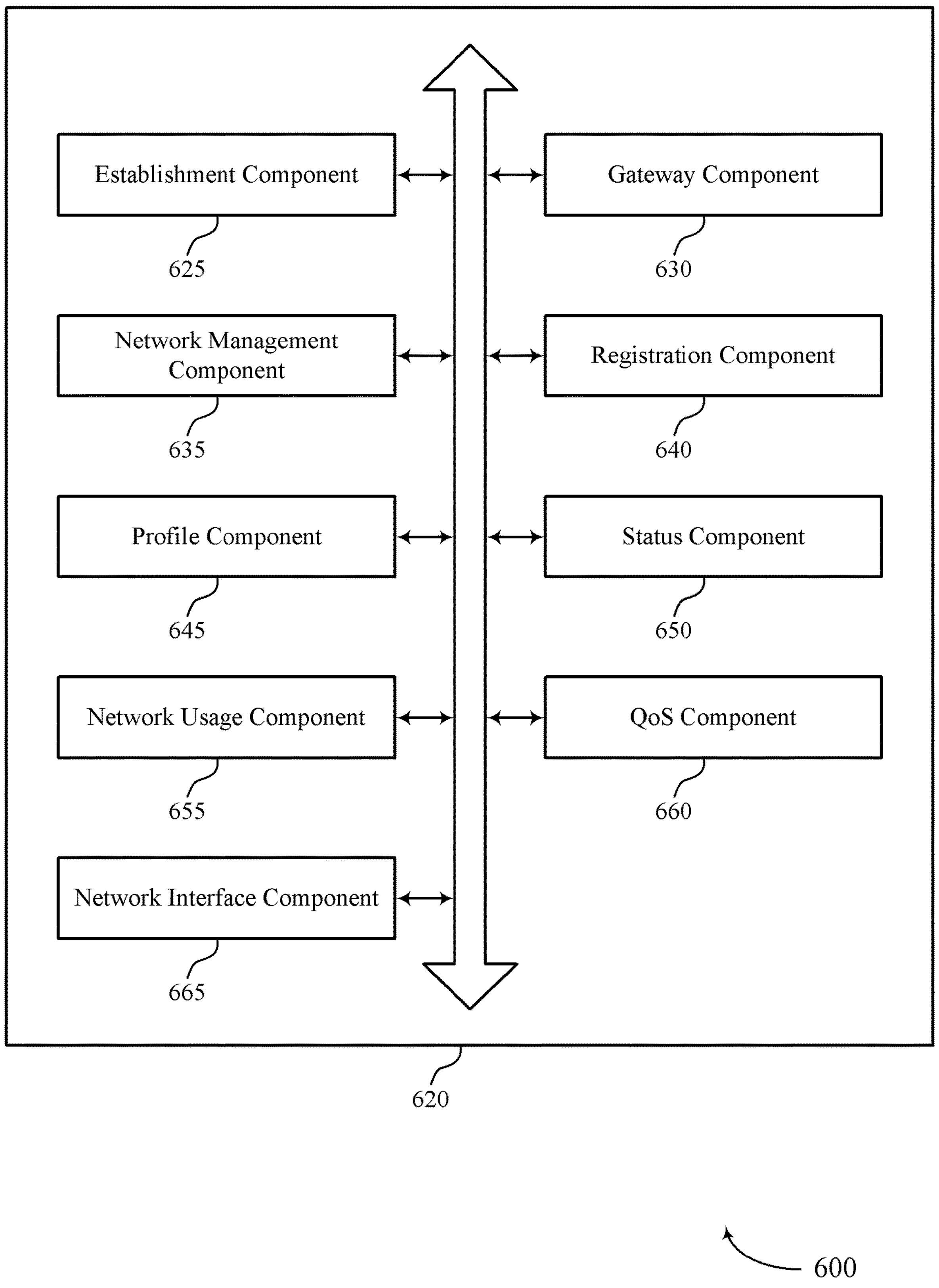
FIG. 6 shows a block diagram of a communications manager that supports a PIN architecture in accordance with one or more aspects of the present disclosure.

FIG. 6 shows a block diagram 600 of a communications manager 620 that supports a PIN architecture in accordance with one or more aspects of the present disclosure. The communications manager 620 may be an example of aspects of a communications manager 420, a communications manager 520, or both, as described herein. The communications manager 620, or various components thereof, may be an example of means for performing various aspects of a PIN architecture as described herein. For example, the communications manager 620 may include an establishment component 625, a gateway component 630, a network management component 635, a registration component 640, a profile component 645, a status component 650, a network usage component 655, a QoS component 660, a network interface component 665, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 620 may support wireless communication at a first network node in accordance with examples as disclosed herein. The establishment component 625 may be configured as or otherwise support a means for receiving first information that triggers the first network node to establish a first network that includes a second network node and one or more network elements configured to communicate with each other using a first wireless communication technology. The gateway component 630 may be configured as or otherwise support a means for transmitting, based on the first information via a user plane of a second network, second information to a second network node, where the second information includes network gateway identification information that identifies the second network node as a network gateway for the first network, where the second information includes gateway configuration information indicative of a gateway configuration for the second network node, and where the one or more network elements are configured to communicate with the second network via the second network node configured as the network gateway using a second wireless communication technology. The network management component 635 may be configured as or otherwise support a means for transmitting, based on the first information via the user plane of the second network, third information to a third network node, where the third information includes network management identification information that identifies the third network node as a network management element for the first network, and where the third information includes network management configuration information indicative of a management configuration for the third network node.

In some examples, the registration component 640 may be configured as or otherwise support a means for transmitting, to at least one of the second network node, the third network node, or a network element of the one or more network elements, registration information to enable one or more additional network elements to join the first network.

In some examples, the registration component 640 may be configured as or otherwise support a means for transmitting, to at least one of the second network node, the third network node, or a network element of the one or more network elements, registration information to enable the network element to be at least one of: an additional network gateway for the first network, or an additional network management element for the first network.

In some examples, the profile component 645 may be configured as or otherwise support a means for receiving a profile from at least one of the second network node, the third network node, or a network element of the one or more network elements, where the profile includes at least one of wireless communication technology capability information or an identifier for association with the first network.

In some examples, the wireless communication technology capability information indicates that a non-cellular technology is supported by the second network node or the network element from which the profile is received.

In some examples, the profile component 645 may be configured as or otherwise support a means for associating the profile with role information indicative of a role in the first network of the second network node, the third network node, or the network element.

In some examples, the status component 650 may be configured as or otherwise support a means for receiving an indication of whether a network element of the one or more network elements is active or inactive in the first network.

In some examples, the status component 650 may be configured as or otherwise support a means for receiving an indication of whether the first network is active or inactive.

In some examples, the network management component 635 may be configured as or otherwise support a means for transmitting, to at least one of the second network node, the third network node, or a network element of the one or more network elements of the first network, management policy information of the first network.

In some examples, the network usage component 655 may be configured as or otherwise support a means for receiving billing information pertaining to use of the first network by one or more of the second network node, the third network node, or a network element of the one or more network elements of the first network.

In some examples, the network usage component 655 may be configured as or otherwise support a means for receiving network usage information pertaining to use of the first network by one or more of the second network node, the third network node, or a network element of the one or more network elements of the first network.

In some examples, the QoS component 660 may be configured as or otherwise support a means for transmitting, to at least one of the second network node or the third network node, QoS control information for communication between the one or more network elements and the second network.

In some examples, the network interface component 665 may be configured as or otherwise support a means for interfacing with one or more network functions of the second network regarding access between the first network and the second network.

In some examples, the access between the first network and the second network is regulated by at least one of a subscription or a policy which is communicated between the first network node and the one or more network functions of the second network.

In some examples, the one or more network functions of the second network include an NEF, a PCF, a UDM function, or a UDR function.

In some examples, the second network node and the third network node are a same network node.

In some examples, the first wireless communication technology is a non-cellular technology and the second wireless communication technology is a cellular technology.

In some examples, the first network is a PIN.

Figure 7:
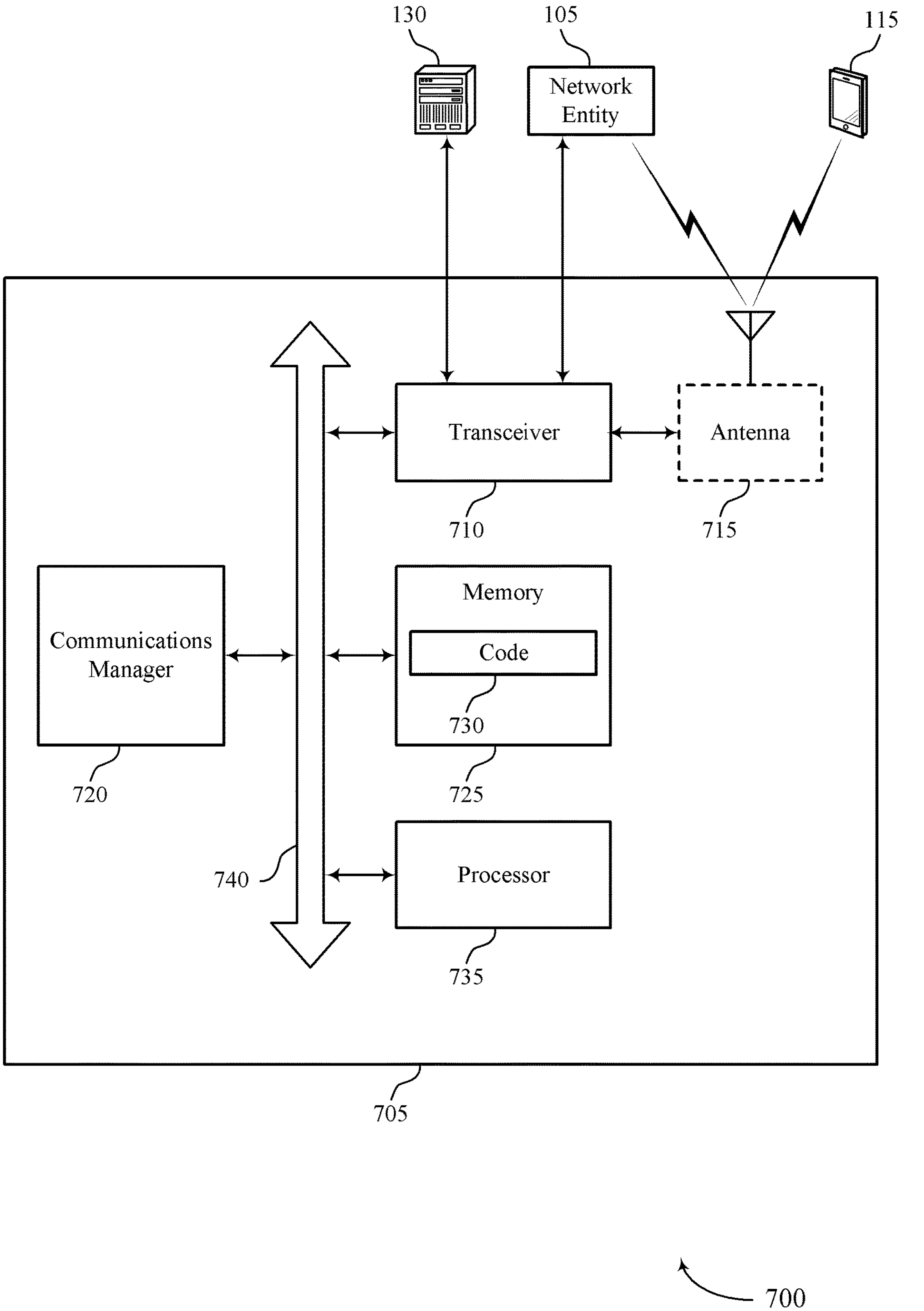
FIG. 7 shows a diagram of a system including a device that supports a PIN architecture in accordance with one or more aspects of the present disclosure.

FIG. 7 shows a diagram of a system 700 including a device 705 that supports a PIN architecture in accordance with one or more aspects of the present disclosure. The device 705 may be an example of or include the components of a device 405, a device 505, a PIN application server, or a network entity 105 as described herein. The device 705 may communicate with one or more network entities 105, one or more UEs 115, or any combination thereof, which may include communications over one or more wired interfaces, over one or more wireless interfaces, or any combination thereof. The device 705 may include components that support outputting and obtaining communications, such as a communications manager 720, a transceiver 710, an antenna 715, a memory 725, code 730, and a processor 735. These components may be in electronic communication or otherwise coupled (e.g., operatively, communicatively, functionally, electronically, electrically) via one or more buses (e.g., a bus 740).

The transceiver 710 may support bi-directional communications via wired links, wireless links, or both as described herein. In some examples, the transceiver 710 may include a wired transceiver and may communicate bi-directionally with another wired transceiver. Additionally, or alternatively, in some examples, the transceiver 710 may include a wireless transceiver and may communicate bi-directionally with another wireless transceiver. In some examples, the device 705 may include one or more antennas 715, which may be capable of transmitting or receiving wireless transmissions (e.g., concurrently). The transceiver 710 may also include a modem to modulate signals, to provide the modulated signals for transmission (e.g., by one or more antennas 715, by a wired transmitter), to receive modulated signals (e.g., from one or more antennas 715, from a wired receiver), and to demodulate signals. The transceiver 710, or the transceiver 710 and one or more antennas 715 or wired interfaces, where applicable, may be an example of a transmitter 415, a transmitter 515, a receiver 410, a receiver 510, or any combination thereof or component thereof, as described herein. In some examples, the transceiver may be operable to support communications via one or more communications links (e.g., a communication link 125, a backhaul communication link 120, a midhaul communication link 162, a fronthaul communication link 168).

The memory 725 may include RAM and ROM. The memory 725 may store computer-readable, computer-executable code 730 including instructions that, when executed by the processor 735, cause the device 705 to perform various functions described herein. The code 730 may be stored in a non-transitory computer-readable medium such as system memory or another type of memory. In some cases, the code 730 may not be directly executable by the processor 735 but may cause a computer (e.g., when compiled and executed) to perform functions described herein. In some cases, the memory 725 may contain, among other things, a BIOS which may control basic hardware or software operation such as the interaction with peripheral components or devices.

The processor 735 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 735 may be configured to operate a memory array using a memory controller. In some other cases, a memory controller may be integrated into the processor 735. The processor 735 may be configured to execute computer-readable instructions stored in a memory (e.g., the memory

725) to cause the device 705 to perform various functions (e.g., functions or tasks supporting a PIN architecture). For example, the device 705 or a component of the device 705 may include a processor 735 and memory 725 coupled with the processor 735, the processor 735 and memory 725 configured to perform various functions described herein. The processor 735 may be an example of a cloud-computing platform (e.g., one or more physical nodes and supporting software such as operating systems, virtual machines, or container instances) that may host the functions (e.g., by executing code 730) to perform the functions of the device 705.

In some examples, a bus 740 may support communications of (e.g., within) a protocol layer of a protocol stack. In some examples, a bus 740 may support communications associated with a logical channel of a protocol stack (e.g., between protocol layers of a protocol stack), which may include communications performed within a component of the device 705, or between different components of the device 705 that may be co-located or located in different locations (e.g., where the device 705 may refer to a system in which one or more of the communications manager 720, the transceiver 710, the memory 725, the code 730, and the processor 735 may be located in one of the different components or divided between different components).

In some examples, the communications manager 720 may manage aspects of communications with a core network 130 (e.g., via one or more wired or wireless backhaul links). For example, the communications manager 720 may manage the transfer of data communications for client devices, such as one or more UEs 115. In some examples, the communications manager 720 may manage communications with other network entities 105, and may include a controller or scheduler for controlling communications with UEs 115 in cooperation with other network entities 105. In some examples, the communications manager 720 may support an X2 interface within an LTE/LTE-A wireless communications network technology to provide communication between network entities 105.

The communications manager 720 may support wireless communication at a first network node in accordance with examples as disclosed herein. For example, the communications manager 720 may be configured as or otherwise support a means for receiving first information that triggers the first network node to establish a first network that includes a second network node and one or more network elements configured to communicate with each other using a first wireless communication technology. The communications manager 720 may be configured as or otherwise support a means for transmitting, based on the first information via a user plane of a second network, second information to a second network node, where the second information includes network gateway identification information that identifies the second network node as a network gateway for the first network, where the second information includes gateway configuration information indicative of a gateway configuration for the second network node, and where the one or more network elements are configured to communicate with the second network via the second network node configured as the network gateway using a second wireless communication technology. The communications manager 720 may be configured as or otherwise support a means for transmitting, based on the first information via the user plane of the second network, third information to a third network node, where the third information includes network management identification information that identifies the third network node as a network management element for the first network, and where the third information includes network management configuration information indicative of a management configuration for the third network node.

By including or configuring the communications manager 720 in accordance with examples as described herein, the device 705 may support techniques for PIN configuration, management, and operation, among other benefits.

In some examples, the communications manager 720 may be configured to perform various operations (e.g., receiving, obtaining, monitoring, outputting, transmitting) using or otherwise in cooperation with the transceiver 710, the one or more antennas 715 (e.g., where applicable), or any combination thereof. Although the communications manager 720 is illustrated as a separate component, in some examples, one or more functions described with reference to the communications manager 720 may be supported by or performed by the processor 735, the memory 725, the code 730, the transceiver 710, or any combination thereof. For example, the code 730 may include instructions executable by the processor 735 to cause the device 705 to perform various aspects of a PIN architecture as described herein, or the processor 735 and the memory 725 may be otherwise configured to perform or support such operations.

Figure 8:
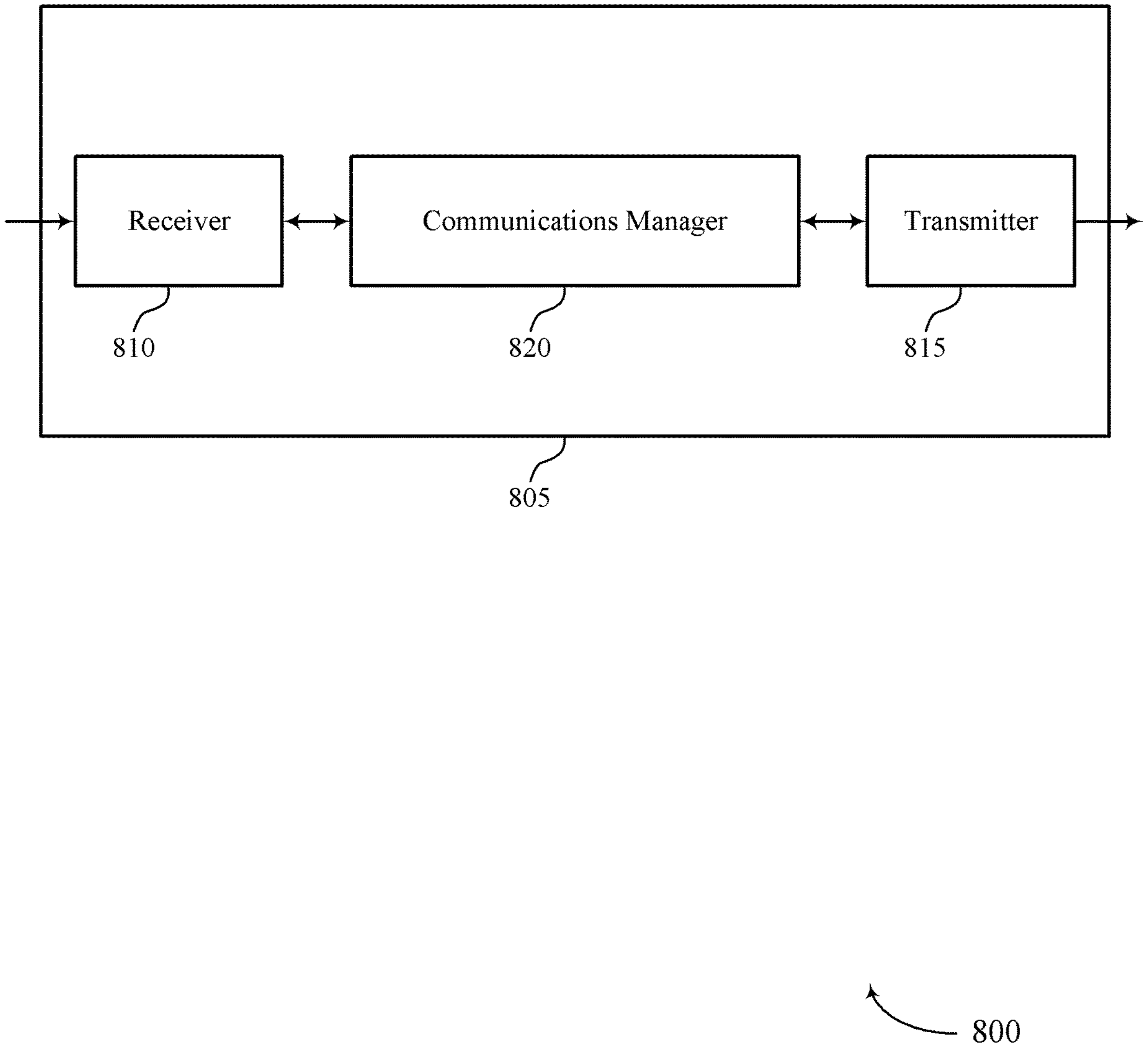
FIGS. 8 and 9 show block diagrams of devices that support a PIN architecture in accordance with one or more aspects of the present disclosure.

FIG. 8 shows a block diagram 800 of a device 805 that supports a PIN architecture in accordance with one or more aspects of the present disclosure. The device 805 may be an example of aspects of a PEMC, a PEGC, or a UE 115 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to a PIN architecture). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to a PIN architecture). In some examples, the transmitter 815 may be co-located with a receiver 810 in a transceiver module. The transmitter 815 may utilize a single antenna or a set of multiple antennas.

The communications manager 820, the receiver 810, the transmitter 815, or various combinations thereof or various components thereof may be examples of means for performing various aspects of a PIN architecture as described herein. For example, the communications manager 820, the receiver 810, the transmitter 815, or various combinations or components thereof may support a method for performing one or more of the functions described herein.

In some examples, the communications manager 820, the receiver 810, the transmitter 815, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 820, the receiver 810, the transmitter 815, or various combinations or components thereof may be implemented in code (e.g., as communications management software or firmware) executed by a processor. If implemented in code executed by a processor, the functions of the communications manager 820, the receiver 810, the transmitter 815, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 820 may be configured to perform various operations (e.g., receiving, obtaining, monitoring, outputting, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to obtain information, output information, or perform various other operations as described herein.

The communications manager 820 may support wireless communication at a first network node in accordance with examples as disclosed herein. For example, the communications manager 820 may be configured as or otherwise support a means for transmitting first information to a second network node that triggers the establishment of a first network that includes a network gateway and one or more network elements configured to communicate with each other using a first wireless communication technology, where the one or more network elements are configured to communicate with a second network via the network gateway using a second wireless communication technology. The communications manager 820 may be configured as or otherwise support a means for receiving, in response to the first information via a user plane of the second network, second information from the second network node, where the second information includes network management identification information that identifies the first network node as a network management element for the first network, and where the second information includes network management configuration information indicative of a management configuration for the first network node.

Additionally, or alternatively, the communications manager 820 may support wireless communication at a first network node in accordance with examples as disclosed herein. For example, the communications manager 820 may be configured as or otherwise support a means for receiving first information from a second network node including network gateway identification information that identifies the first network node as a network gateway in a first network, where the first network includes the network gateway and one or more network elements configured to communicate with each other using a first wireless communication technology, where the one or more network elements are configured to communicate with a second network via the first network node configured as the network gateway using a second wireless communication technology, and where the first information is received via a user plane of the second network. The communications manager 820 may be configured as or otherwise support a means for relay communication between the second network and the one or more network elements in accordance with management by a third network node that being a network management element for the first network.

By including or configuring the communications manager 820 in accordance with examples as described herein, the device 805 (e.g., a processor controlling or otherwise coupled with the receiver 810, the transmitter 815, the communications manager 820, or a combination thereof) may support techniques for PIN configuration, management, and operation, among other benefits.

Figure 9:
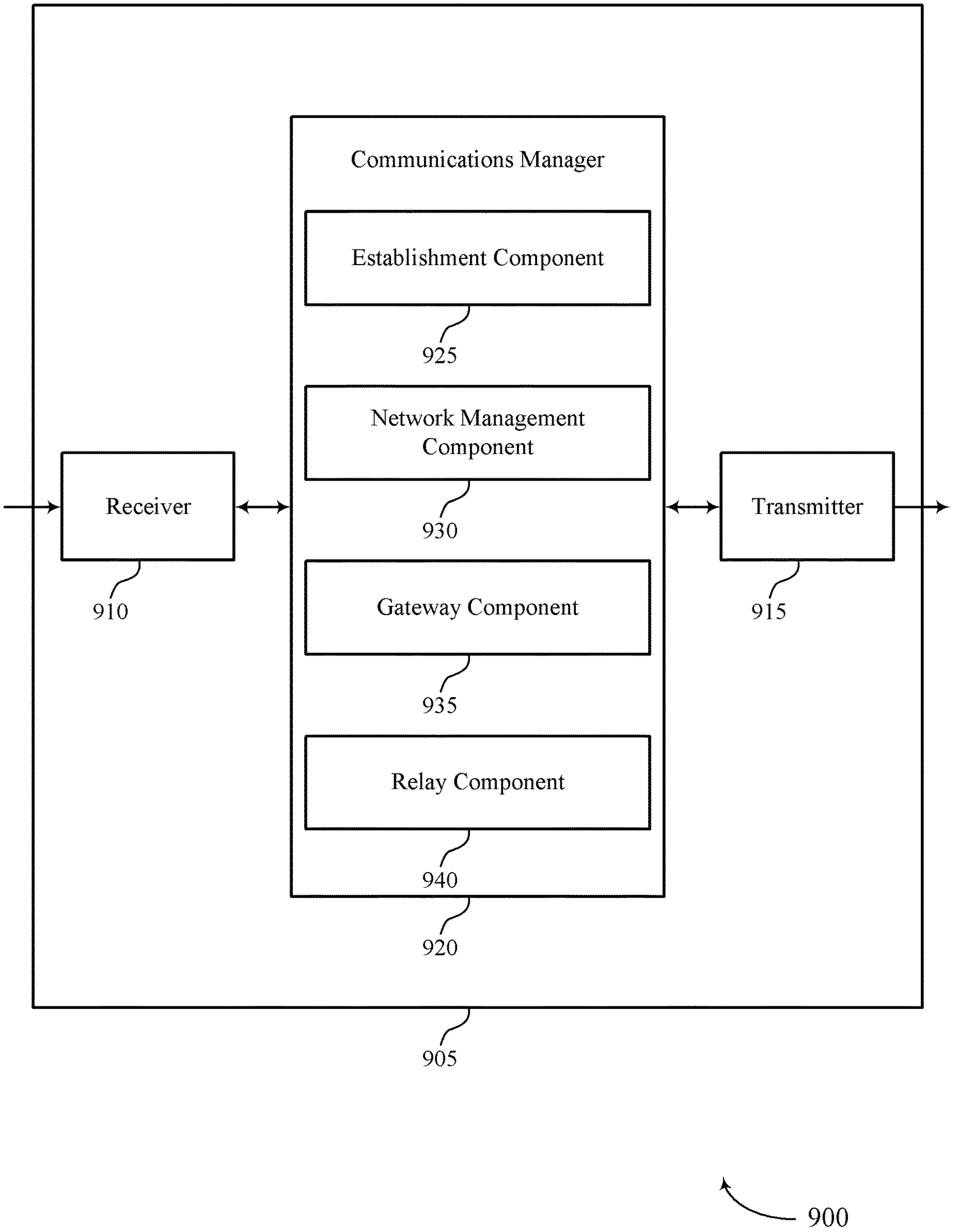

FIG. 9 shows a block diagram 900 of a device 905 that supports a PIN architecture in accordance with one or more aspects of the present disclosure. The device 905 may be an example of aspects of a device 805, a PEMC, a PEGC, or a UE 115 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to a PIN architecture). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to a PIN architecture). In some examples, the transmitter 915 may be co-located with a receiver 910 in a transceiver module. The transmitter 915 may utilize a single antenna or a set of multiple antennas.

The device 905, or various components thereof, may be an example of means for performing various aspects of a PIN architecture as described herein. For example, the communications manager 920 may include an establishment component 925, a network management component 930, a gateway component 935, a relay component 940, or any combination thereof. The communications manager 920 may be an example of aspects of a communications manager 820 as described herein. In some examples, the communications manager 920, or various components thereof, may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communication at a first network node in accordance with examples as disclosed herein. The establishment component 925 may be configured as or otherwise support a means for transmitting first information to a second network node that triggers the establishment of a first network that includes a network gateway and one or more network elements configured to communicate with each other using a first wireless communication technology, where the one or more network elements are configured to communicate with a second network via the network gateway using a second wireless communication technology. The network management component 930 may be configured as or otherwise support a means for receiving, in response to the first information via a user plane of the second network, second information from the second network node, where the second information includes network management identification information that identifies the first network node as a network management element for the first network, and where the second information includes network management configuration information indicative of a management configuration for the first network node.

Additionally, or alternatively, the communications manager 920 may support wireless communication at a first network node in accordance with examples as disclosed herein. The gateway component 935 may be configured as or otherwise support a means for receiving first information from a second network node including network gateway identification information that identifies the first network node as a network gateway in a first network, where the first network includes the network gateway and one or more network elements configured to communicate with each other using a first wireless communication technology, where the one or more network elements are configured to communicate with a second network via the first network node configured as the network gateway using a second wireless communication technology, and where the first information is received via a user plane of the second network. The relay component 940 may be configured as or otherwise support a means for relaying communication between the second network and the one or more network elements in accordance with management by a third network node that is a network management element for the first network.

Figure 10:
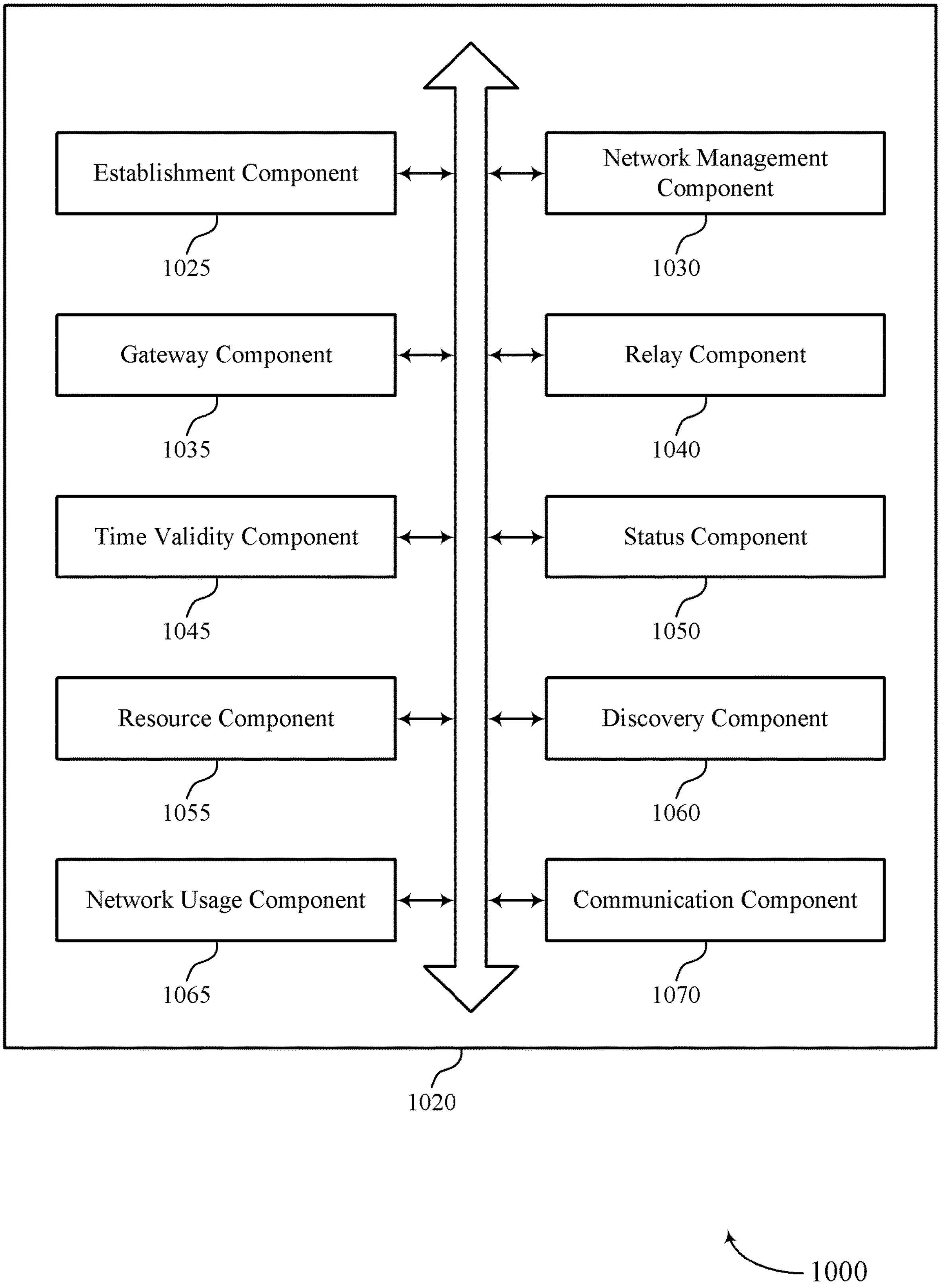
FIG. 10 shows a block diagram of a communications manager that supports a PIN architecture in accordance with one or more aspects of the present disclosure.

FIG. 10 shows a block diagram 1000 of a communications manager 1020 that supports a PIN architecture in accordance with one or more aspects of the present disclosure. The communications manager 1020 may be an example of aspects of a communications manager 820, a communications manager 920, or both, as described herein. The communications manager 1020, or various components thereof, may be an example of means for performing various aspects of a PIN architecture as described herein. For example, the communications manager 1020 may include an establishment component 1025, a network management component 1030, a gateway component 1035, a relay component 1040, a time validity component 1045, a status component 1050, a resource component 1055, a discovery component 1060, a network usage component 1065, a communication component 1070, or any combination thereof. Each of these components may communicate, directly or indirectly, with one another (e.g., via one or more buses).

The communications manager 1020 may support wireless communication at a first network node in accordance with examples as disclosed herein. The establishment component 1025 may be configured as or otherwise support a means for transmitting first information to a second network node that triggers the establishment of a first network that includes a network gateway and one or more network elements configured to communicate with each other using a first wireless communication technology, where the one or more network elements are configured to communicate with a second network via the network gateway using a second wireless communication technology. The network management component 1030 may be configured as or otherwise support a means for receiving, in response to the first information via a user plane of the second network, second information from the second network node, where the second information includes network management identification information that identifies the first network node as a network management element for the first network, and where the second information includes network management configuration information indicative of a management configuration for the first network node.

In some examples, the establishment component 1025 may be configured as or otherwise support a means for communicating with the second network node to establish the first network.

In some examples, the network management component 1030 may be configured as or otherwise support a means for communicating with the second network node to modify, delete, activate, or deactivate the first network.

In some examples, the network management component 1030 may be configured as or otherwise support a means for communicating with the second network node to remove a network element of the one or more network elements from the first network.

In some examples, the network management component 1030 may be configured as or otherwise support a means for communicating with the second network node to add a network element of the one or more network elements to the first network.

In some examples, the network management component 1030 may be configured as or otherwise support a means for communicating with the second network node to add an additional network element to the first network.

In some examples, the network management component 1030 may be configured as or otherwise support a means for communicating with the second network node in order to remove the network gateway from the first network.

In some examples, the network management component 1030 may be configured as or otherwise support a means for communicating with the second network node in order to add the network gateway to the first network.

In some examples, the network management component 1030 may be configured as or otherwise support a means for communicating with the second network node in order to add an additional network gateway to the first network.

In some examples, the time validity component 1045 may be configured as or otherwise support a means for communicating with the second network node regarding a period of time for which at least one of the first network, the network gateway, or a network element of the one or more network elements are valid.

In some examples, the status component 1050 may be configured as or otherwise support a means for communicating with the second network node regarding a status of at least one of the first network or a network element of the one or more network elements, the status indicating whether the first network is active or inactive or whether the network element is active or inactive within the first network.

In some examples, the first network node and the network gateway are a same network node.

In some examples, the first wireless communication technology is a non-cellular technology and the second wireless communication technology is a cellular technology.

In some examples, the first network is a PIN.

Additionally, or alternatively, the communications manager 1020 may support wireless communication at a first network node in accordance with examples as disclosed herein. The gateway component 1035 may be configured as or otherwise support a means for receiving first information from a second network node including network gateway identification information that identifies the first network node as a network gateway in a first network, where the first network includes the network gateway and one or more network elements configured to communicate with each other using a first wireless communication technology, where the one or more network elements are configured to communicate with a second network via the first network node configured as the network gateway using a second wireless communication technology, and where the first information is received via a user plane of the second network. The relay component 1040 may be configured as or otherwise support a means for relaying communication between the second network and the one or more network elements in accordance with management by a third network node that is a network management element for the first network.

In some examples, the resource component 1055 may be configured as or otherwise support a means for provisioning one or more resources to the one or more network elements for communication between the one or more network elements within the first network.

In some examples, the relay component 1040 may be configured as or otherwise support a means for relaying communication between two network elements via the first network in accordance with management by the third network node.

In some examples, the network management component 1030 may be configured as or otherwise support a means for communicating, with a network element of the one or more network elements, management information associated with deletion of the network element from the first network. In some examples, the network management component 1030 may be configured as or otherwise support a means for transmitting an indication to the second network node or the third network node of the deletion.

In some examples, the discovery component 1060 may be configured as or otherwise support a means for communicating, with a network element of the one or more network elements, discovery information associated with addition of the network element to the first network. In some examples, the discovery component 1060 may be configured as or otherwise support a means for transmitting an indication to the second network node or the third network node of the addition.

In some examples, the discovery component 1060 may be configured as or otherwise support a means for communicating, with an additional network element, discovery information associated with addition of the additional network element to the first network. In some examples, the discovery component 1060 may be configured as or otherwise support a means for transmit an indication to the second network node or the third network node of the addition.

In some examples, the status component 1050 may be configured as or otherwise support a means for transmitting, to the second network node, an indication of a status of the one or more network elements, the status indicating whether individual ones of the one or more network elements are active or inactive within the first network.

In some examples, the relay component 1040 may be configured as or otherwise support a means for providing access to the second network for the one or more network elements of the first network, the access provided in accordance with a traffic management policy of at least one of the second network node or the third network node.

In some examples, the network usage component 1065 may be configured as or otherwise support a means for transmitting, to the second network node, a report indicative of network usage information of one or more of the one or more network elements of the first network.

In some examples, the relay component 1040 may be configured as or otherwise support a means for establishing a downlink path for communications from the second network to a network element of the one or more network elements of the first network.

In some examples, the communication component 1070 may be configured as or otherwise support a means for managing, independent of the first network, traffic routing for communications between additional network nodes unable to join or not present in the first network.

In some examples, the first network node and the network management element are a same network node.

In some examples, the first wireless communication technology is a non-cellular technology and the second wireless communication technology is a cellular technology.

In some examples, the first network is a PIN.

Figure 11:
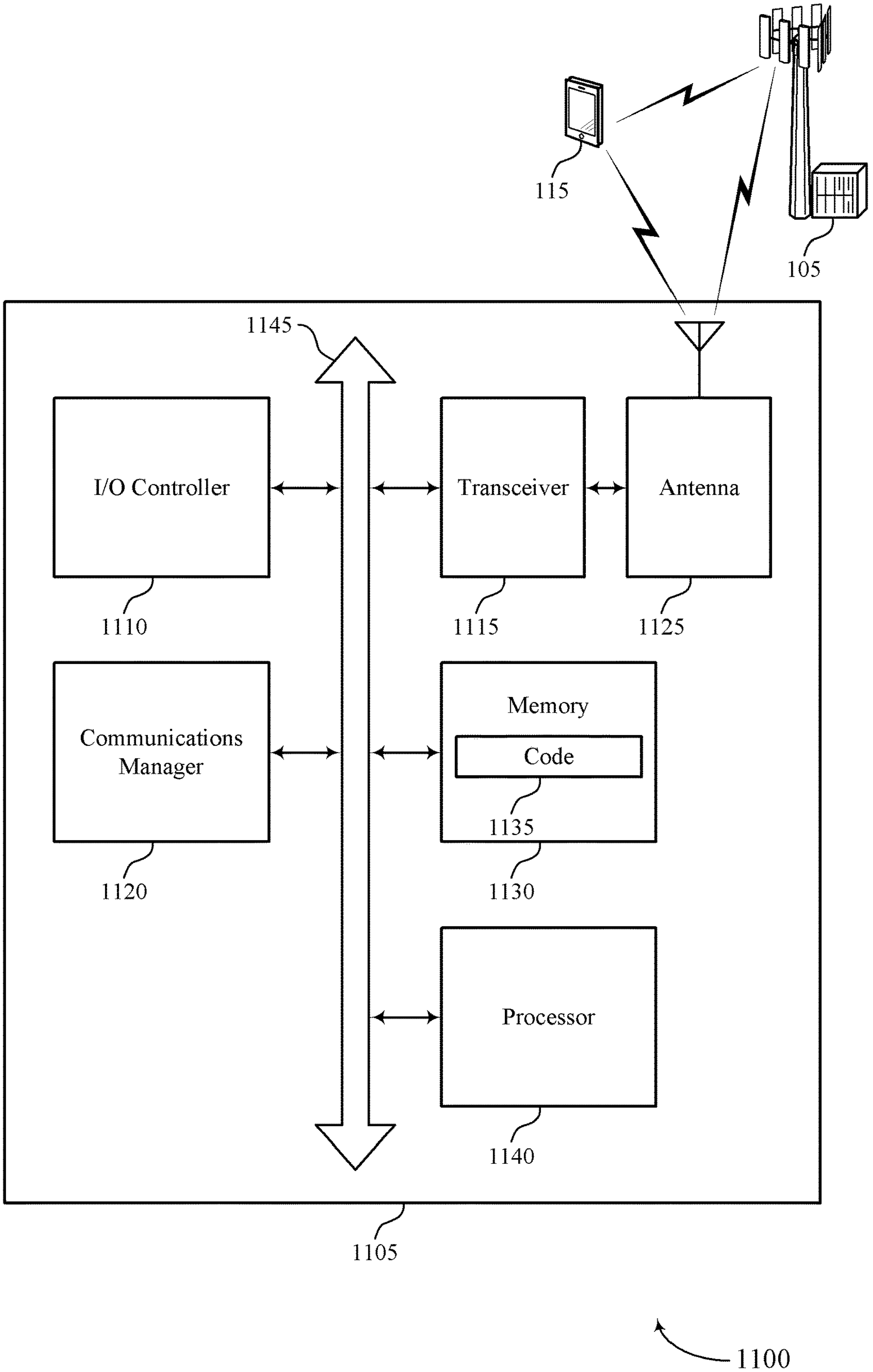
FIG. 11 shows a diagram of a system including a device that supports a PIN architecture in accordance with one or more aspects of the present disclosure.

FIG. 11 shows a diagram of a system 1100 including a device 1105 that supports a PIN architecture in accordance with one or more aspects of the present disclosure. The device 1105 may be an example of or include the components of a device 805, a device 905, a PEMC, a PEGC, or a UE 115 as described herein. The device 1105 may communicate (e.g., wirelessly) with one or more network entities 105, one or more UEs 115, or any combination thereof. The device 1105 may include components for bi-directional voice and data communications including components for transmitting and receiving communications, such as a communications manager 1120, an input/output (I/O) controller 1110, a transceiver 1115, an antenna 1125, a memory 1130, code 1135, and a processor 1140. These components may be in electronic communication or otherwise coupled (e.g., operatively, communicatively, functionally, electronically, electrically) via one or more buses (e.g., a bus 1145).

The I/O controller 1110 may manage input and output signals for the device 1105. The I/O controller 1110 may also manage peripherals not integrated into the device 1105. In some cases, the I/O controller 1110 may represent a physical connection or port to an external peripheral. In some cases, the I/O controller 1110 may utilize an operating system such as iOS®, ANDROID®, MS-DOS®, MS-WINDOWS®, OS/2®, UNIX®, LINUX®, or another known operating system. Additionally or alternatively, the I/O controller 1110 may represent or interact with a modem, a keyboard, a mouse, a touchscreen, or a similar device. In some cases, the I/O controller 1110 may be implemented as part of a processor, such as the processor 1140. In some cases, a user may interact with the device 1105 via the I/O controller 1110 or via hardware components controlled by the I/O controller 1110.

In some cases, the device 1105 may include a single antenna 1125. However, in some other cases, the device 1105 may have more than one antenna 1125, which may be capable of concurrently transmitting or receiving multiple wireless transmissions. The transceiver 1115 may communicate bi-directionally, via the one or more antennas 1125, wired, or wireless links as described herein. For example, the transceiver 1115 may represent a wireless transceiver and may communicate bi-directionally with another wireless transceiver. The transceiver 1115 may also include a modem to modulate the packets, to provide the modulated packets to one or more antennas 1125 for transmission, and to demodulate packets received from the one or more antennas 1125.

The transceiver 1115, or the transceiver 1115 and one or more antennas 1125, may be an example of a transmitter 815, a transmitter 915, a receiver 810, a receiver 910, or any combination thereof or component thereof, as described herein.

The memory 1130 may include random access memory (RAM) and read-only memory (ROM). The memory 1130 may store computer-readable, computer-executable code 1135 including instructions that, when executed by the processor 1140, cause the device 1105 to perform various functions described herein. The code 1135 may be stored in a non-transitory computer-readable medium such as system memory or another type of memory. In some cases, the code 1135 may not be directly executable by the processor 1140 but may cause a computer (e.g., when compiled and executed) to perform functions described herein. In some cases, the memory 1130 may contain, among other things, a basic I/O system (BIOS) which may control basic hardware or software operation such as the interaction with peripheral components or devices.

The processor 1140 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting a PIN architecture). For example, the device 1105 or a component of the device 1105 may include a processor 1140 and memory 1130 coupled with or to the processor 1140, the processor 1140 and memory 1130 configured to perform various functions described herein.

The communications manager 1120 may support wireless communication at a first network node in accordance with examples as disclosed herein. For example, the communications manager 1120 may be configured as or otherwise support a means for transmitting first information to a second network node that triggers the establishment of a first network that includes a network gateway and one or more network elements configured to communicate with each other using a first wireless communication technology, where the one or more network elements are configured to communicate with a second network via the network gateway using a second wireless communication technology. The communications manager 1120 may be configured as or otherwise support a means for receiving, in response to the first information via a user plane of the second network, second information from the second network node, where the second information includes network management identification information that identifies the first network node as a network management element for the first network, and where the second information includes network management configuration information indicative of a management configuration for the first network node.

Additionally, or alternatively, the communications manager 1120 may support wireless communication at a first network node in accordance with examples as disclosed herein. For example, the communications manager 1120 may be configured as or otherwise support a means for receiving first information from a second network node including network gateway identification information that identifies the first network node as a network gateway in a first network, where the first network includes the network gateway and one or more network elements configured to communicate with each other using a first wireless communication technology, where the one or more network elements are configured to communicate with a second network via the first network node configured as the network gateway using a second wireless communication technology, and where the first information is received via a user plane of the second network. The communications manager 1120 may be configured as or otherwise support a means for relay communication between the second network and the one or more network elements in accordance with management by a third network node that being a network management element for the first network.

By including or configuring the communications manager 1120 in accordance with examples as described herein, the device 1105 may support techniques for PIN configuration, management, and operation, among other benefits.

In some examples, the communications manager 1120 may be configured to perform various operations (e.g., receiving, monitoring, transmitting) using or otherwise in cooperation with the transceiver 1115, the one or more antennas 1125, or any combination thereof. Although the communications manager 1120 is illustrated as a separate component, in some examples, one or more functions described with reference to the communications manager 1120 may be supported by or performed by the processor 1140, the memory 1130, the code 1135, or any combination thereof. For example, the code 1135 may include instructions executable by the processor 1140 to cause the device 1105 to perform various aspects of a PIN architecture as described herein, or the processor 1140 and the memory 1130 may be otherwise configured to perform or support such operations.

Figure 12:
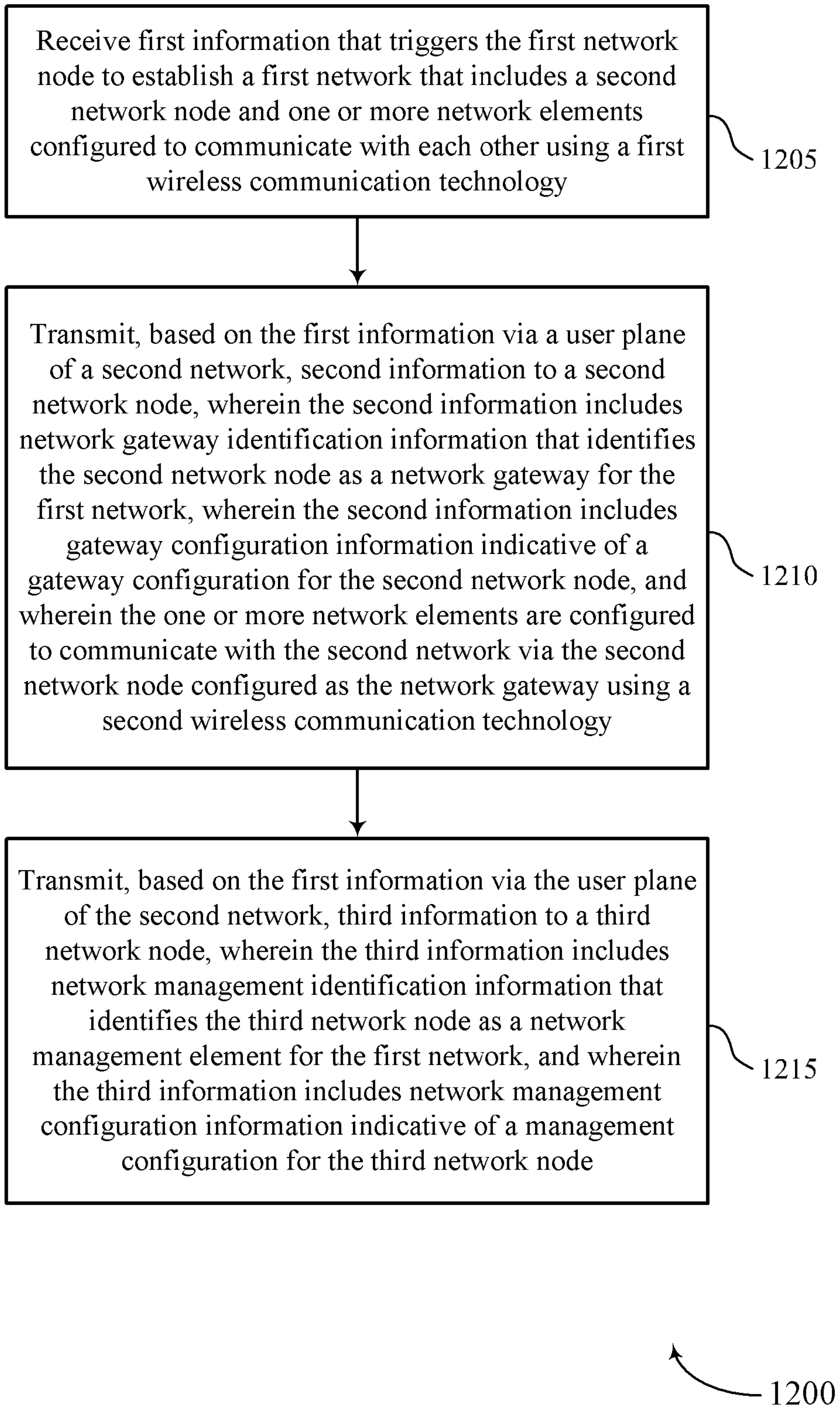
FIGS. 12 through 20 show flowcharts illustrating methods that support a PIN architecture in accordance with one or more aspects of the present disclosure.

FIG. 12 shows a flowchart illustrating a method 1200 that supports a PIN architecture in accordance with one or more aspects of the present disclosure. The operations of the method 1200 may be implemented by a PIN application server or a network entity (referred to as a first network node) or its components as described herein. For example, the operations of the method 1200 may be performed by a PIN application server or a network entity as described with reference to FIGS. 1 through 7. In some examples, a PIN application server or a network entity may execute a set of instructions to control the functional elements of the PIN application server or the network entity to perform the described functions. Additionally, or alternatively, the PIN application server or the network entity may perform aspects of the described functions using special-purpose hardware.

At 1205, the method may include receiving first information that triggers the first network node to establish a first network that includes a second network node and one or more network elements configured to communicate with each other using a first wireless communication technology. The operations of 1205 may be performed in accordance with examples as disclosed herein. In some examples, aspects of the operations of 1205 may be performed by an establishment component 625 as described with reference to FIG. 6.

At 1210, the method may include transmitting, based on the first information via a user plane of a second network, second information to a second network node, where the second information includes network gateway identification information that identifies the second network node as a network gateway for the first network, where the second information includes gateway configuration information indicative of a gateway configuration for the second network node, and where the one or more network elements are configured to communicate with the second network via the second network node configured as the network gateway using a second wireless communication technology. The operations of 1210 may be performed in accordance with examples as disclosed herein. In some examples, aspects of the operations of 1210 may be performed by a gateway component 630 as described with reference to FIG. 6.

At 1215, the method may include transmitting, based on the first information via the user plane of the second network, third information to a third network node, where the third information includes network management identification information that identifies the third network node as a network management element for the first network, and where the third information includes network management configuration information indicative of a management configuration for the third network node. The operations of 1215 may be performed in accordance with examples as disclosed herein. In some examples, aspects of the operations of 1215 may be performed by a network management component 635 as described with reference to FIG. 6.

Figure 13:
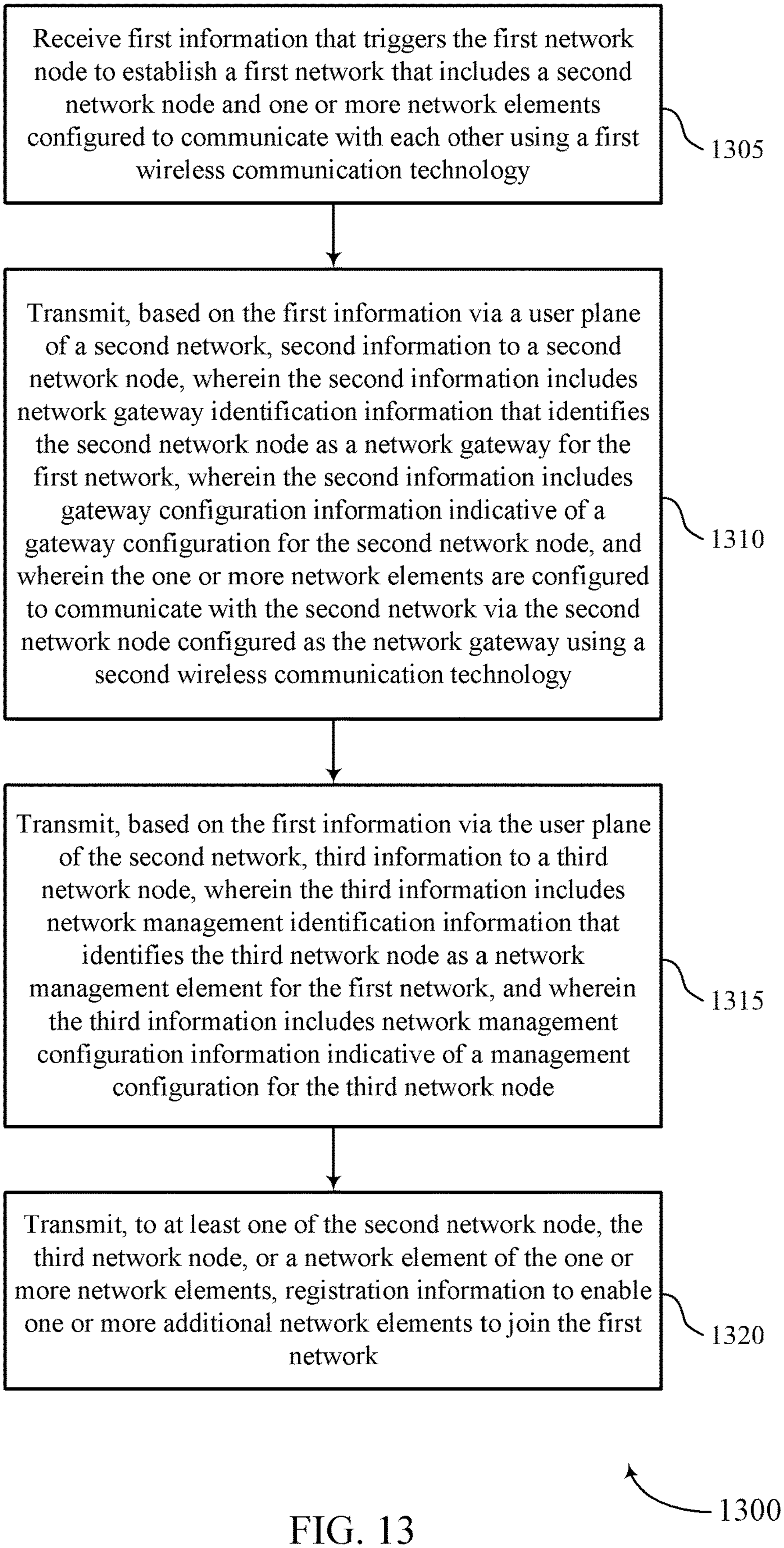

FIG. 13 shows a flowchart illustrating a method 1300 that supports a PIN architecture in accordance with one or more aspects of the present disclosure. The operations of the method 1300 may be implemented by a PIN application server or a network entity (referred to as a first network node) or its components as described herein. For example, the operations of the method 1300 may be performed by a PIN application server or a network entity as described with reference to FIGS. 1 through 7. In some examples, a PIN application server or a network entity may execute a set of instructions to control the functional elements of the PIN application server or the network entity to perform the described functions. Additionally, or alternatively, the PIN application server or the network entity may perform aspects of the described functions using special-purpose hardware.

At 1305, the method may include receiving first information that triggers the first network node to establish a first network that includes a second network node and one or more network elements configured to communicate with each other using a first wireless communication technology. The operations of 1305 may be performed in accordance with examples as disclosed herein. In some examples, aspects of the operations of 1305 may be performed by an establishment component 625 as described with reference to FIG. 6.

At 1310, the method may include transmitting, based on the first information via a user plane of a second network, second information to a second network node, where the second information includes network gateway identification information that identifies the second network node as a network gateway for the first network, where the second information includes gateway configuration information indicative of a gateway configuration for the second network node, and where the one or more network elements are configured to communicate with the second network via the second network node configured as the network gateway using a second wireless communication technology. The operations of 1310 may be performed in accordance with examples as disclosed herein. In some examples, aspects of the operations of 1310 may be performed by a gateway component 630 as described with reference to FIG. 6.

At 1315, the method may include transmitting, based on the first information via the user plane of the second network, third information to a third network node, where the third information includes network management identification information that identifies the third network node as a network management element for the first network, and where the third information includes network management configuration information indicative of a management configuration for the third network node. The operations of 1315 may be performed in accordance with examples as disclosed herein. In some examples, aspects of the operations of 1315 may be performed by a network management component 635 as described with reference to FIG. 6.

At 1320, the method may include transmitting, to at least one of the second network node, the third network node, or a network element of the one or more network elements, registration information to enable one or more additional network elements to join the first network. The operations of 1320 may be performed in accordance with examples as disclosed herein. In some examples, aspects of the operations of 1320 may be performed by a registration component 640 as described with reference to FIG. 6.

Figure 14:
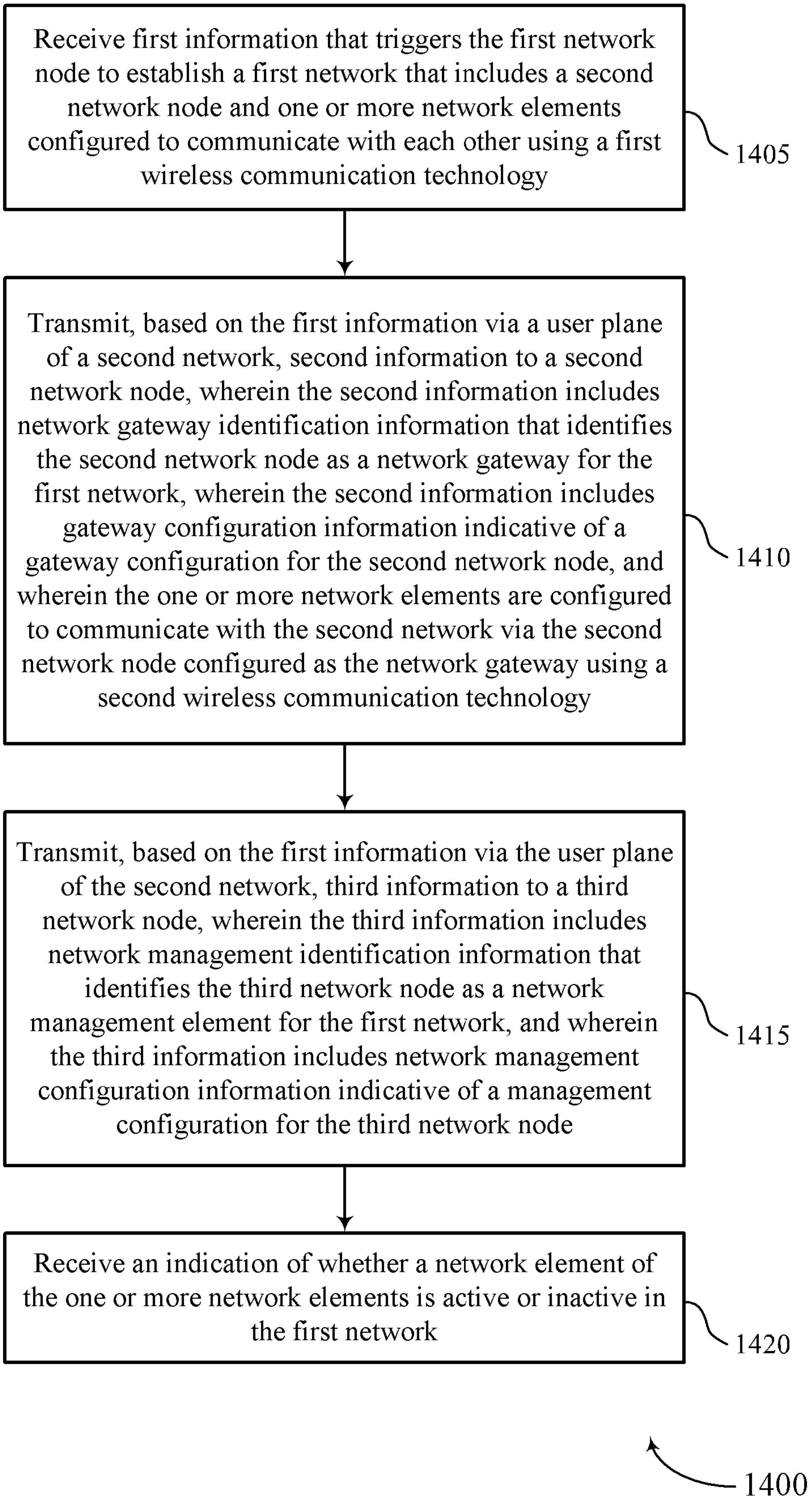

FIG. 14 shows a flowchart illustrating a method 1400 that supports a PIN architecture in accordance with one or more aspects of the present disclosure. The operations of the method 1400 may be implemented by a PIN application server or a network entity (referred to as a first network node) or its components as described herein. For example, the operations of the method 1400 may be performed by a PIN application server or a network entity as described with reference to FIGS. 1 through 7. In some examples, a PIN application server or a network entity may execute a set of instructions to control the functional elements of the PIN application server or the network entity to perform the described functions. Additionally, or alternatively, the PIN application server or the network entity may perform aspects of the described functions using special-purpose hardware.

At 1405, the method may include receiving first information that triggers the first network node to establish a first network that includes a second network node and one or more network elements configured to communicate with each other using a first wireless communication technology. The operations of 1405 may be performed in accordance with examples as disclosed herein. In some examples, aspects of the operations of 1405 may be performed by an establishment component 625 as described with reference to FIG. 6.

At 1410, the method may include transmitting, based on the first information via a user plane of a second network, second information to a second network node, where the second information includes network gateway identification information that identifies the second network node as a network gateway for the first network, where the second information includes gateway configuration information indicative of a gateway configuration for the second network node, and where the one or more network elements are configured to communicate with the second network via the second network node configured as the network gateway using a second wireless communication technology. The operations of 1410 may be performed in accordance with examples as disclosed herein. In some examples, aspects of the operations of 1410 may be performed by a gateway component 630 as described with reference to FIG. 6.

At 1415, the method may include transmitting, based on the first information via the user plane of the second network, third information to a third network node, where the third information includes network management identification information that identifies the third network node as a network management element for the first network, and where the third information includes network management configuration information indicative of a management configuration for the third network node. The operations of 1415 may be performed in accordance with examples as disclosed herein. In some examples, aspects of the operations of 1415 may be performed by a network management component 635 as described with reference to FIG. 6.

At 1420, the method may include receiving an indication of whether a network element of the one or more network elements is active or inactive in the first network. The operations of 1420 may be performed in accordance with examples as disclosed herein. In some examples, aspects of the operations of 1420 may be performed by a status component 650 as described with reference to FIG. 6.

Figure 15:
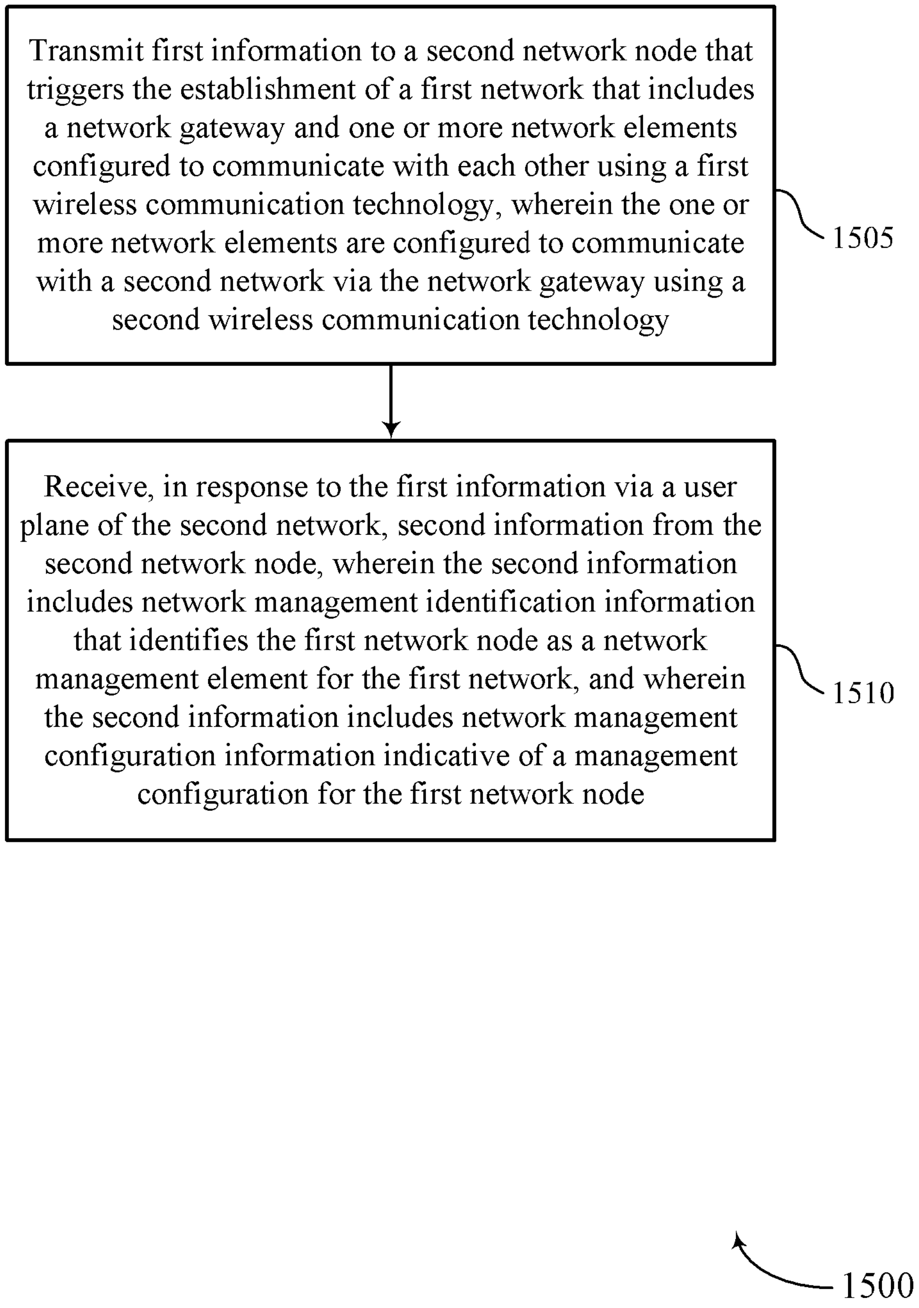

FIG. 15 shows a flowchart illustrating a method 1500 that supports a PIN architecture in accordance with one or more aspects of the present disclosure. The operations of the method 1500 may be implemented by a PEMC or a UE (referred to as a first network node) or its components as described herein. For example, the operations of the method 1500 may be performed by a PEMC or a UE 115 as described with reference to FIGS. 1 through 3 and 8 through 11. In some examples, a PEMC or a UE may execute a set of instructions to control the functional elements of the PEMC or the UE to perform the described functions. Additionally, or alternatively, the PEMC or the UE may perform aspects of the described functions using special-purpose hardware.

At 1505, the method may include transmitting first information to a second network node that triggers the establishment of a first network that includes a network gateway and one or more network elements configured to communicate with each other using a first wireless communication technology, where the one or more network elements are configured to communicate with a second network via the network gateway using a second wireless communication technology. The operations of 1505 may be performed in accordance with examples as disclosed herein. In some examples, aspects of the operations of 1505 may be performed by an establishment component 1025 as described with reference to FIG. 10.

At 1510, the method may include receiving, in response to the first information via a user plane of the second network, second information from the second network node, where the second information includes network management identification information that identifies the first network node as a network management element for the first network, and where the second information includes network management configuration information indicative of a management configuration for the first network node. The operations of 1510 may be performed in accordance with examples as disclosed herein. In some examples, aspects of the operations of 1510 may be performed by a network management component 1030 as described with reference to FIG. 10.

Figure 16:
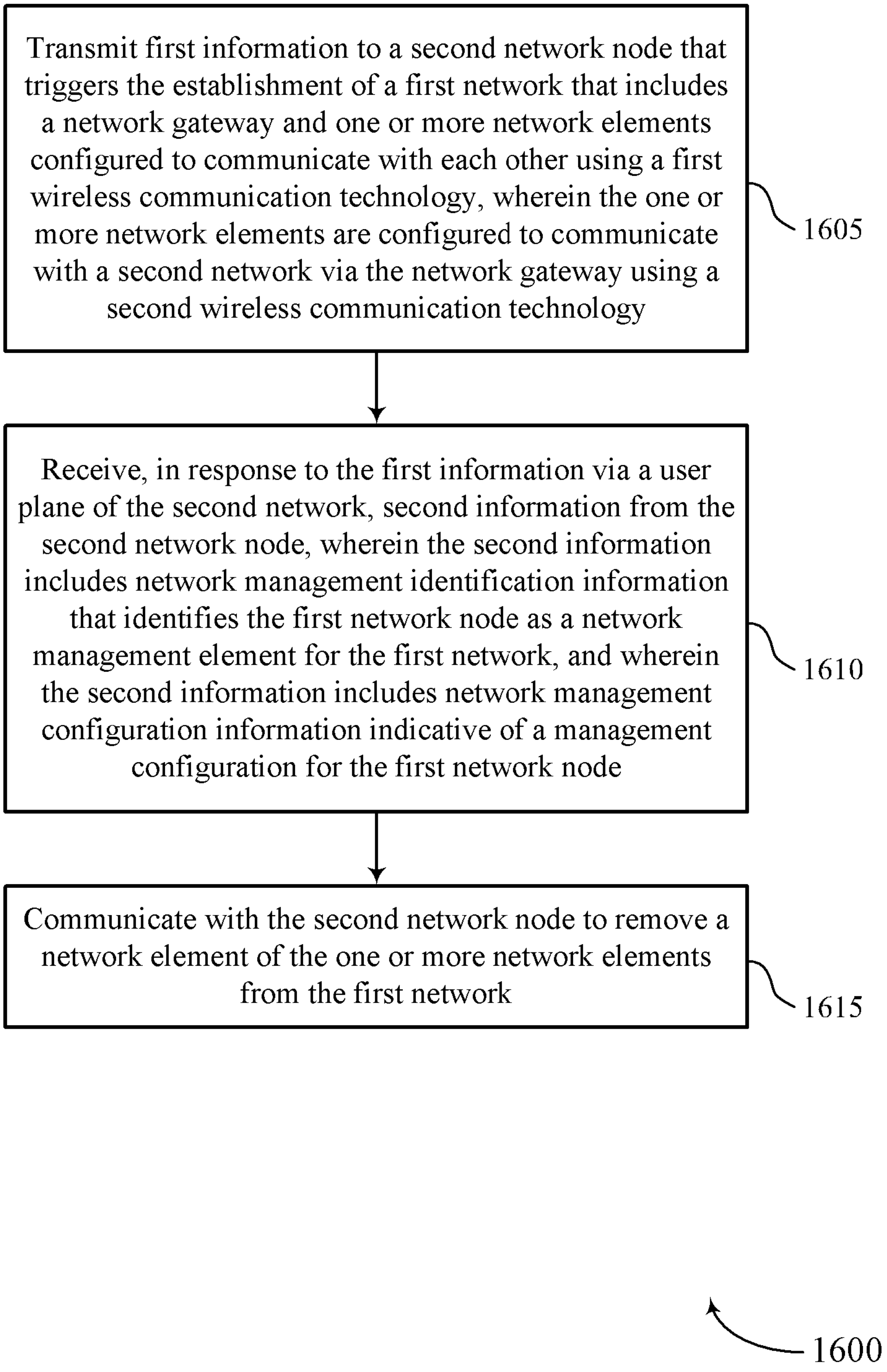

FIG. 16 shows a flowchart illustrating a method 1600 that supports a PIN architecture in accordance with one or more aspects of the present disclosure. The operations of the method 1600 may be implemented by a PEMC or a UE or its components as described herein. For example, the operations of the method 1600 may be performed by a PEMC or a UE 115 as described with reference to FIGS. 1 through 3 and 8 through 11. In some examples, a PEMC or a UE may execute a set of instructions to control the functional elements of the PEMC or the UE to perform the described functions. Additionally, or alternatively, the PEMC or the UE may perform aspects of the described functions using special-purpose hardware.

At 1605, the method may include transmitting first information to a second network node that triggers the establishment of a first network that includes a network gateway and one or more network elements configured to communicate with each other using a first wireless communication technology, where the one or more network elements are configured to communicate with a second network via the network gateway using a second wireless communication technology. The operations of 1605 may be performed in accordance with examples as disclosed herein. In some examples, aspects of the operations of 1605 may be performed by an establishment component 1025 as described with reference to FIG. 10.

At 1610, the method may include receiving, in response to the first information via a user plane of the second network, second information from the second network node, where the second information includes network management identification information that identifies the first network node as a network management element for the first network, and where the second information includes network management configuration information indicative of a management configuration for the first network node. The operations of 1610 may be performed in accordance with examples as disclosed herein. In some examples, aspects of the operations of 1610 may be performed by a network management component 1030 as described with reference to FIG. 10.

At 1615, the method may include communicating with the second network node to remove a network element of the one or more network elements from the first network. The operations of 1615 may be performed in accordance with examples as disclosed herein. In some examples, aspects of the operations of 1615 may be performed by a network management component 1030 as described with reference to FIG. 10.

Figure 17:
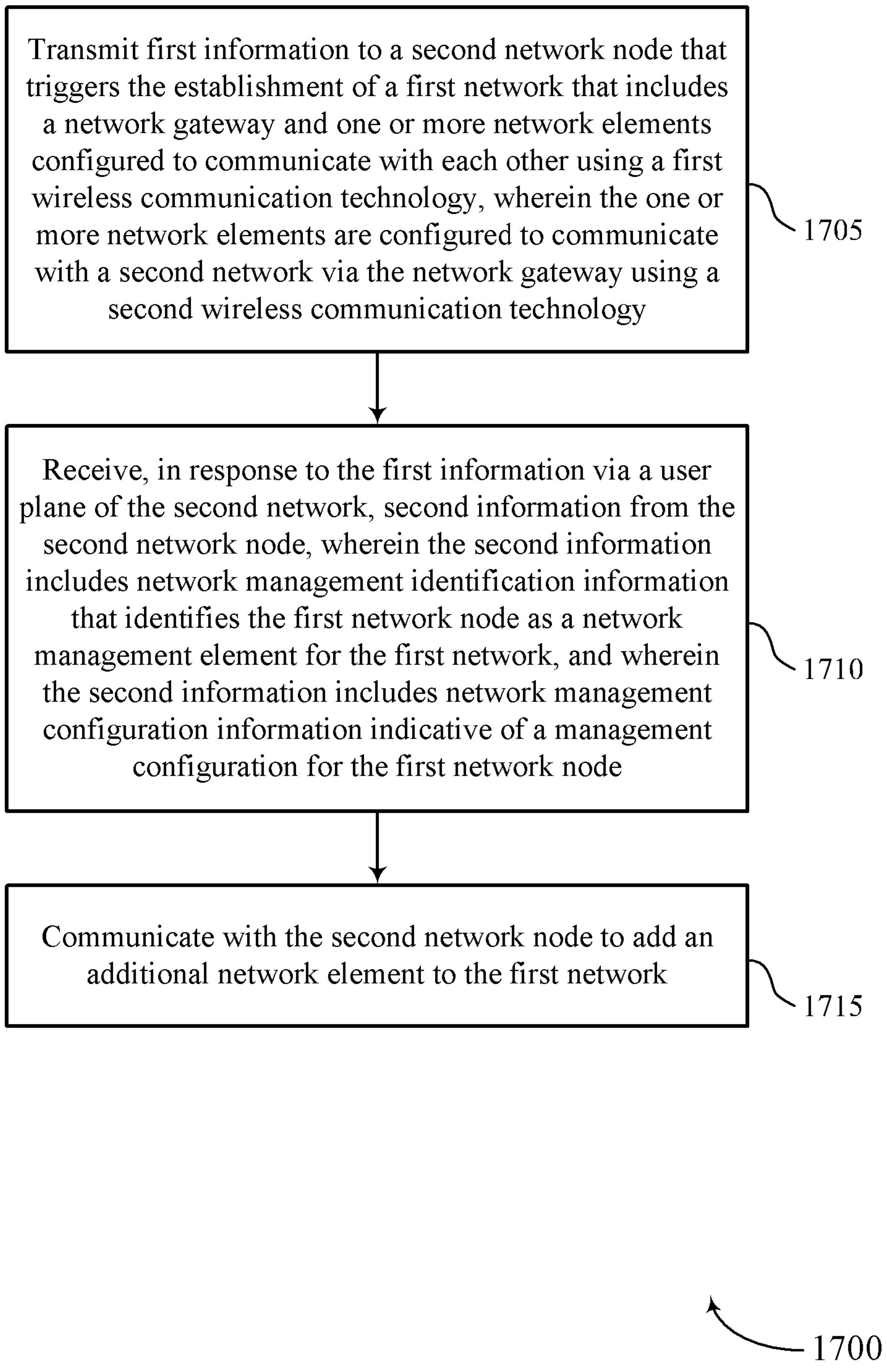

FIG. 17 shows a flowchart illustrating a method 1700 that supports a PIN architecture in accordance with one or more aspects of the present disclosure. The operations of the method 1700 may be implemented by a PEMC or a UE or its components as described herein. For example, the operations of the method 1700 may be performed by a PEMC or a UE 115 as described with reference to FIGS. 1 through 3 and 8 through 11. In some examples, a PEMC or a UE may execute a set of instructions to control the functional elements of the PEMC or the UE to perform the described functions. Additionally, or alternatively, the PEMC or the UE may perform aspects of the described functions using special-purpose hardware.

At 1705, the method may include transmitting first information to a second network node that triggers the establishment of a first network that includes a network gateway and one or more network elements configured to communicate with each other using a first wireless communication technology, where the one or more network elements are configured to communicate with a second network via the network gateway using a second wireless communication technology. The operations of 1705 may be performed in accordance with examples as disclosed herein. In some examples, aspects of the operations of 1705 may be performed by an establishment component 1025 as described with reference to FIG. 10.

At 1710, the method may include receiving, in response to the first information via a user plane of the second network, second information from the second network node, where the second information includes network management identification information that identifies the first network node as a network management element for the first network, and where the second information includes network management configuration information indicative of a management configuration for the first network node. The operations of 1710 may be performed in accordance with examples as disclosed herein. In some examples, aspects of the operations of 1710 may be performed by a network management component 1030 as described with reference to FIG. 10.

At 1715, the method may include communicating with the second network node to add an additional network element to the first network. The operations of 1715 may be performed in accordance with examples as disclosed herein. In some examples, aspects of the operations of 1715 may be performed by a network management component 1030 as described with reference to FIG. 10.

Figure 18:
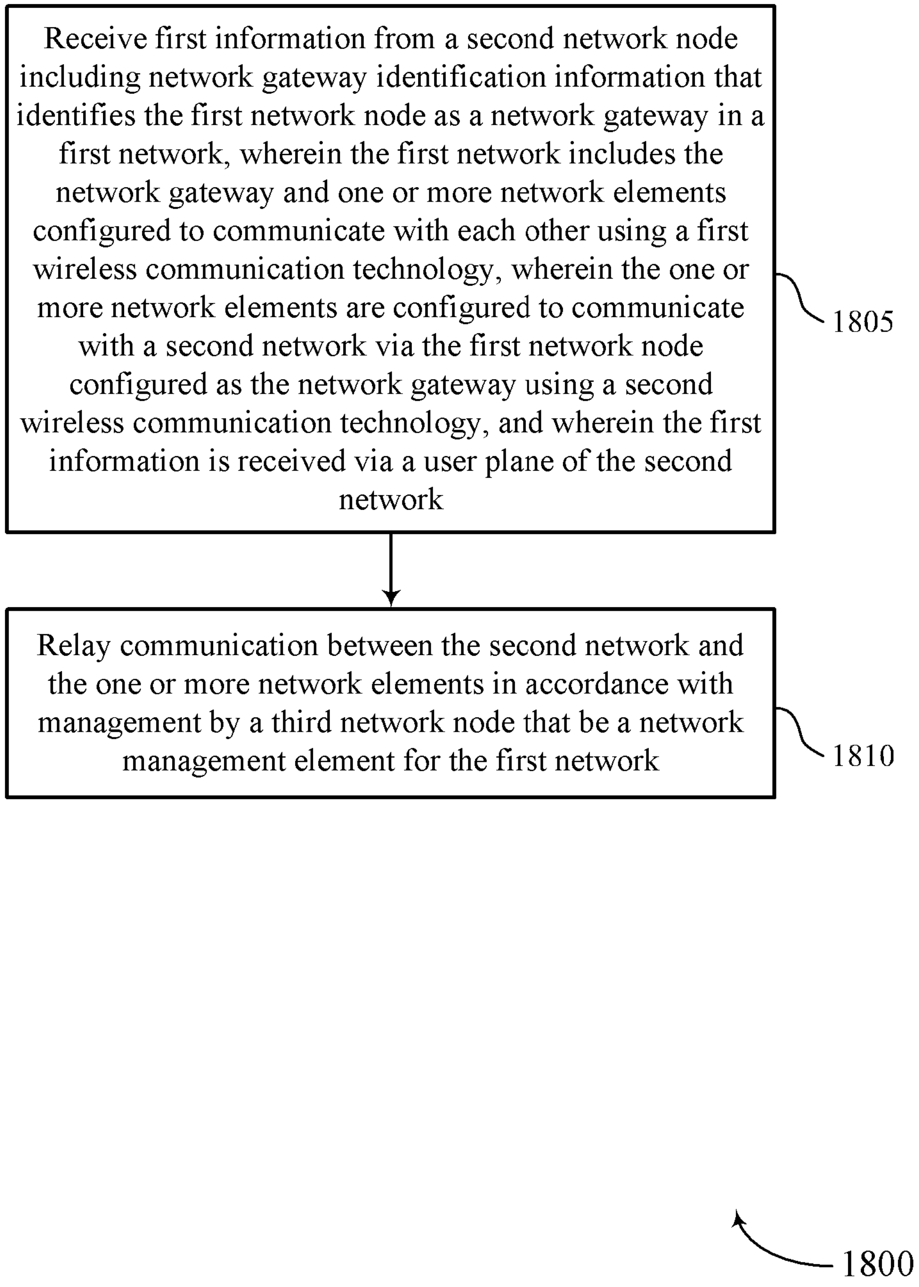

FIG. 18 shows a flowchart illustrating a method 1800 that supports a PIN architecture in accordance with one or more aspects of the present disclosure. The operations of the method 1800 may be implemented by a PEGC or a UE or its components as described herein. For example, the operations of the method 1800 may be performed by a PEGC or a UE 115 as described with reference to FIGS. 1 through 3 and 8 through 11. In some examples, a PEGC or a UE may execute a set of instructions to control the functional elements of the PEGC or the UE to perform the described functions. Additionally, or alternatively, the PEGC or the UE may perform aspects of the described functions using special-purpose hardware.

At 1805, the method may include receiving first information from a second network node including network gateway identification information that identifies the first network node as a network gateway in a first network, where the first network includes the network gateway and one or more network elements configured to communicate with each other using a first wireless communication technology, where the one or more network elements are configured to communicate with a second network via the first network node configured as the network gateway using a second wireless communication technology, and where the first information is received via a user plane of the second network. The operations of 1805 may be performed in accordance with examples as disclosed herein. In some examples, aspects of the operations of 1805 may be performed by a gateway component 1035 as described with reference to FIG. 10.

At 1810, the method may include relaying communication between the second network and the one or more network elements in accordance with management by a third network node that is a network management element for the first network. The operations of 1810 may be performed in accordance with examples as disclosed herein. In some examples, aspects of the operations of 1810 may be performed by a relay component 1040 as described with reference to FIG. 10.

Figure 19:
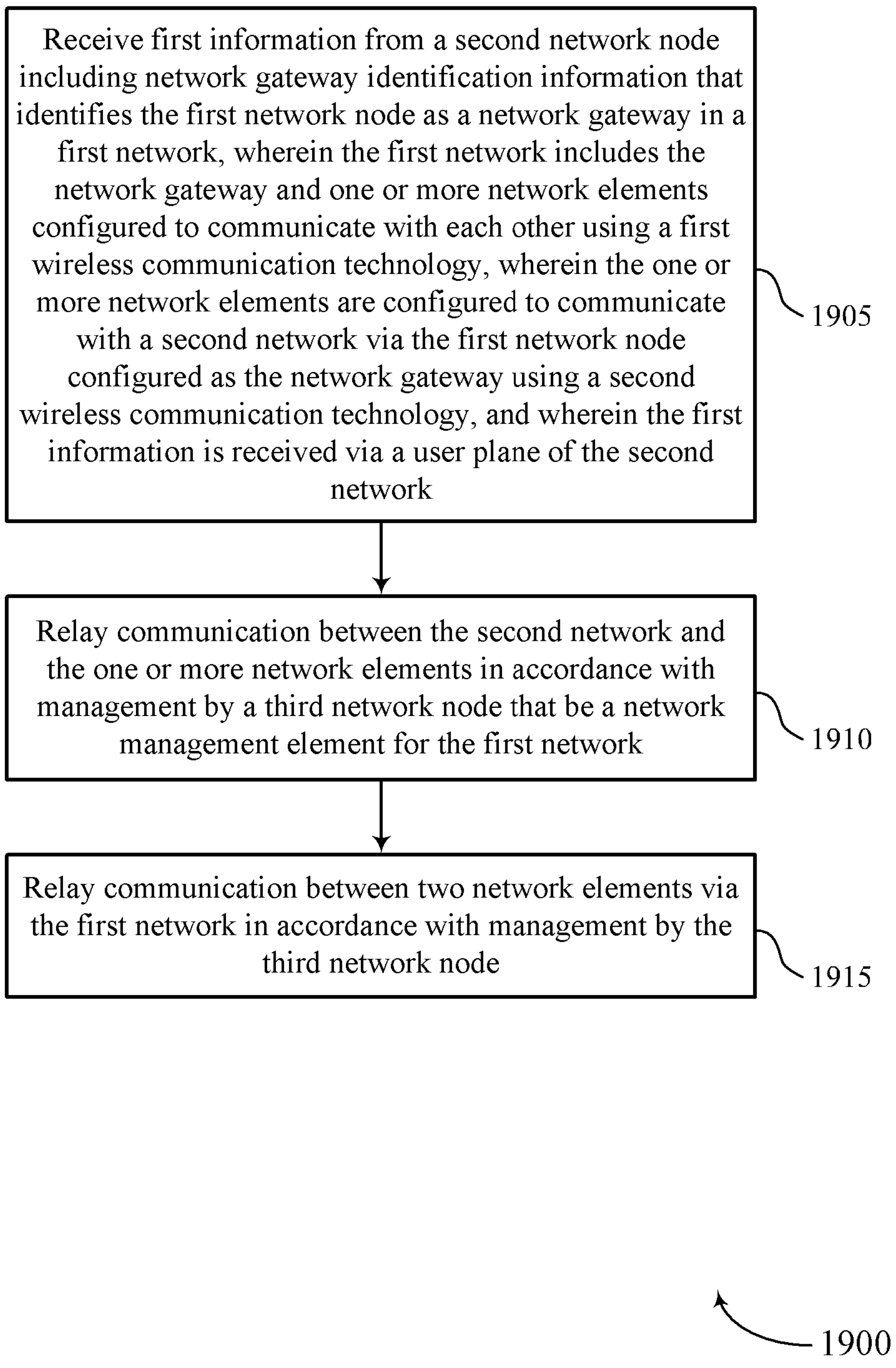

FIG. 19 shows a flowchart illustrating a method 1900 that supports a PIN architecture in accordance with one or more aspects of the present disclosure. The operations of the method 1900 may be implemented by a PEGC or a UE or its components as described herein. For example, the operations of the method 1900 may be performed by a PEGC or a UE 115 as described with reference to FIGS. 1 through 3 and 8 through 11. In some examples, a PEGC or a UE may execute a set of instructions to control the functional elements of the PEGC or the UE to perform the described functions. Additionally, or alternatively, the PEGC or the UE may perform aspects of the described functions using special-purpose hardware.

At 1905, the method may include receiving first information from a second network node including network gateway identification information that identifies the first network node as a network gateway in a first network, where the first network includes the network gateway and one or more network elements configured to communicate with each other using a first wireless communication technology, where the one or more network elements are configured to communicate with a second network via the first network node configured as the network gateway using a second wireless communication technology, and where the first information is received via a user plane of the second network. The operations of 1905 may be performed in accordance with examples as disclosed herein. In some examples, aspects of the operations of 1905 may be performed by a gateway component 1035 as described with reference to FIG. 10.

At 1910, the method may include relaying communication between the second network and the one or more network elements in accordance with management by a third network node that is a network management element for the first network. The operations of 1910 may be performed in accordance with examples as disclosed herein. In some examples, aspects of the operations of 1910 may be performed by a relay component 1040 as described with reference to FIG. 10.

At 1915, the method may include relaying communication between two network elements via the first network in accordance with management by the third network node. The operations of 1915 may be performed in accordance with examples as disclosed herein. In some examples, aspects of the operations of 1915 may be performed by a relay component 1040 as described with reference to FIG. 10.

Figure 20:
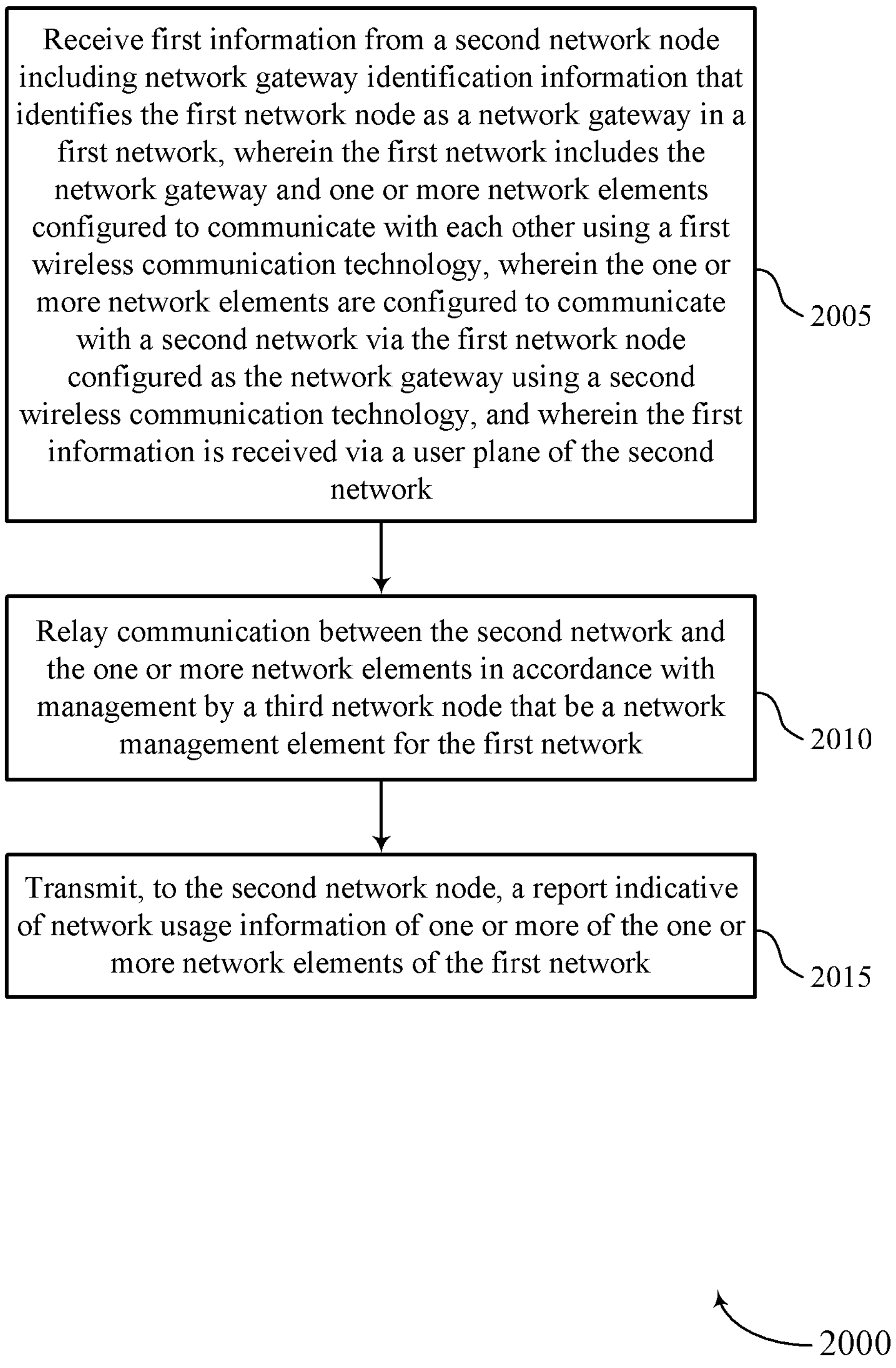

FIG. 20 shows a flowchart illustrating a method 2000 that supports a PIN architecture in accordance with one or more aspects of the present disclosure. The operations of the method 2000 may be implemented by a PEGC or a UE or its components as described herein. For example, the operations of the method 2000 may be performed by a PEGC or a UE 115 as described with reference to FIGS. 1 through 3 and 8 through 11. In some examples, a PEGC or a UE may execute a set of instructions to control the functional elements of the PEGC or the UE to perform the described functions. Additionally, or alternatively, the PEGC or the UE may perform aspects of the described functions using special-purpose hardware.

At 2005, the method may include receiving first information from a second network node including network gateway identification information that identifies the first network node as a network gateway in a first network, where the first network includes the network gateway and one or more network elements configured to communicate with each other using a first wireless communication technology, where the one or more network elements are configured to communicate with a second network via the first network node configured as the network gateway using a second wireless communication technology, and where the first information is received via a user plane of the second network. The operations of 2005 may be performed in accordance with examples as disclosed herein. In some examples, aspects of the operations of 2005 may be performed by a gateway component 1035 as described with reference to FIG. 10.

At 2010, the method may include relaying communication between the second network and the one or more network elements in accordance with management by a third network node that is a network management element for the first network. The operations of 2010 may be performed in accordance with examples as disclosed herein. In some examples, aspects of the operations of 2010 may be performed by a relay component 1040 as described with reference to FIG. 10.

At 2015, the method may include transmitting, to the second network node, a report indicative of network usage information of one or more of the one or more network elements of the first network. The operations of 2015 may be performed in accordance with examples as disclosed herein. In some examples, aspects of the operations of 2015 may be performed by a network usage component 1065 as described with reference to FIG. 10.

The following provides an overview of aspects of the present disclosure:

Aspect 1: A method for wireless communication at a first network node, comprising: receiving first information that triggers the first network node to establish a first network that includes a second network node and one or more network elements configured to communicate with each other using a first wireless communication technology; transmitting, based on the first information via a user plane of a second network, second information to a second network node, wherein the second information includes network gateway identification information that identifies the second network node as a network gateway for the first network, wherein the second information includes gateway configuration information indicative of a gateway configuration for the second network node, and wherein the one or more network elements are configured to communicate with the second network via the second network node configured as the network gateway using a second wireless communication technology; and transmitting, based on the first information via the user plane of the second network, third information to a third network node, wherein the third information includes network management identification information that identifies the third network node as a network management element for the first network, and wherein the third information includes network management configuration information indicative of a management configuration for the third network node.

Aspect 2: The method of aspect 1, further comprising: transmitting, to at least one of the second network node, the third network node, or a network element of the one or more network elements, registration information to enable one or more additional network elements to join the first network.

Aspect 3: The method of any of aspects 1 through 2, further comprising: transmitting, to at least one of the second network node, the third network node, or a network element of the one or more network elements, registration information to enable the network element to be at least one of: an additional network gateway for the first network, or an additional network management element for the first network.

Aspect 4: The method of any of aspects 1 through 3, further comprising: receiving a profile from at least one of the second network node, the third network node, or a network element of the one or more network elements, wherein the profile includes at least one of wireless communication technology capability information or an identifier for association with the first network.

Aspect 5: The method of aspect 4, wherein the wireless communication technology capability information indicates that a non-cellular technology is supported by the second network node or the network element from which the profile is received.

Aspect 6: The method of any of aspects 4 through 5, further comprising: associating the profile with role information indicative of a role in the first network of the second network node, the third network node, or the network element.

Aspect 7: The method of any of aspects 1 through 6, further comprising: receiving an indication of whether a network element of the one or more network elements is active or inactive in the first network.

Aspect 8: The method of any of aspects 1 through 7, further comprising: receiving an indication of whether the first network is active or inactive.

Aspect 9: The method of any of aspects 1 through 8, further comprising: transmitting, to at least one of the second network node, the third network node, or a network element of the one or more network elements of the first network, management policy information of the first network.

Aspect 10: The method of any of aspects 1 through 9, further comprising: receiving billing information pertaining to use of the first network by one or more of the second network node, the third network node, or a network element of the one or more network elements of the first network.

Aspect 11: The method of any of aspects 1 through 10, further comprising: receiving network usage information pertaining to use of the first network by one or more of the second network node, the third network node, or a network element of the one or more network elements of the first network.

Aspect 12: The method of any of aspects 1 through 11, further comprising: transmitting, to at least one of the second network node or the third network node, QoS control information for communication between the one or more network elements and the second network.

Aspect 13: The method of any of aspects 1 through 12, further comprising: interfacing with one or more network functions of the second network regarding access between the first network and the second network.

Aspect 14: The method of aspect 13, wherein the access between the first network and the second network is regulated by at least one of a subscription or a policy which is communicated between the first network node and the one or more network functions of the second network.

Aspect 15: The method of any of aspects 13 through 14, wherein the one or more network functions of the second network include a network exposure function (NEF), a policy control function (PCF), a unified data management (UDM) function, or a unified data repository (UDR) function.

Aspect 16: The method of any of aspects 1 through 15, wherein the second network node and the third network node are a same network node.

Aspect 17: The method of any of aspects 1 through 16, wherein the first wireless communication technology is a non-cellular technology and the second wireless communication technology is a cellular technology.

Aspect 18: The method of any of aspects 1 through 17, wherein the first network is a PIN.

Aspect 19: A method for wireless communication at a first network node, comprising: transmitting first information to a second network node that triggers the establishment of a first network that includes a network gateway and one or more network elements configured to communicate with each other using a first wireless communication technology, wherein the one or more network elements are configured to communicate with a second network via the network gateway using a second wireless communication technology; and receiving, in response to the first information via a user plane of the second network, second information from the second network node, wherein the second information includes network management identification information that identifies the first network node as a network management element for the first network, and wherein the second information includes network management configuration information indicative of a management configuration for the first network node.

Aspect 20: The method of aspect 19, further comprising: communicating with the second network node to establish the first network.

Aspect 21: The method of aspect 20, further comprising: communicating with the second network node to modify, delete, activate, or deactivate the first network.

Aspect 22: The method of any of aspects 19 through 21, further comprising: communicating with the second network node to remove a network element of the one or more network elements from the first network.

Aspect 23: The method of any of aspects 19 through 22, further comprising: communicating with the second network node to add a network element of the one or more network elements to the first network.

Aspect 24: The method of any of aspects 19 through 23, further comprising: communicating with the second network node to add an additional network element to the first network.

Aspect 25: The method of any of aspects 19 through 24, further comprising: communicating with the second network node in order to remove the network gateway from the first network.

Aspect 26: The method of any of aspects 19 through 25, further comprising: communicating with the second network node in order to add the network gateway to the first network.

Aspect 27: The method of any of aspects 19 through 26, further comprising: communicating with the second network node in order to add an additional network gateway to the first network.

Aspect 28: The method of any of aspects 19 through 27, further comprising: communicating with the second network node regarding a period of time for which at least one of the first network, the network gateway, or a network element of the one or more network elements are valid.

Aspect 29: The method of any of aspects 19 through 28, further comprising: communicating with the second network node regarding a status of at least one of the first network or a network element of the one or more network elements, the status indicating whether the first network is active or inactive or whether the network element is active or inactive within the first network.

Aspect 30: The method of any of aspects 19 through 29, wherein the first network node and the network gateway are a same network node.

Aspect 31: The method of any of aspects 19 through 30, wherein the first wireless communication technology is a non-cellular technology and the second wireless communication technology is a cellular technology.

Aspect 32: The method of any of aspects 19 through 31, wherein the first network is a PIN.

Aspect 33: A method for wireless communication at a first network node, comprising: receiving first information from a second network node including network gateway identification information that identifies the first network node as a network gateway in a first network, wherein the first network includes the network gateway and one or more network elements configured to communicate with each other using a first wireless communication technology, wherein the one or more network elements are configured to communicate with a second network via the first network node configured as the network gateway using a second wireless communication technology, and wherein the first information is received via a user plane of the second network; and relaying communication between the second network and the one or more network elements in accordance with management by a third network node that is a network management element for the first network.

Aspect 34: The method of aspect 33, further comprising: provisioning one or more resources to the one or more network elements for communication between the one or more network elements within the first network.

Aspect 35: The method of any of aspects 33 through 34, further comprising: relaying communication between two network elements via the first network in accordance with management by the third network node.

Aspect 36: The method of any of aspects 33 through 35, further comprising: communicating, with a network element of the one or more network elements, management information associated with deletion of the network element from the first network; and transmitting an indication to the second network node or the third network node of the deletion.

Aspect 37: The method of any of aspects 33 through 36, further comprising: communicating, with a network element of the one or more network elements, discovery information associated with addition of the network element to the first network; and transmitting an indication to the second network node or the third network node of the addition.

Aspect 38: The method of any of aspects 33 through 37, further comprising: communicating, with an additional network element, discovery information associated with addition of the additional network element to the first network; and transmit an indication to the second network node or the third network node of the addition.

Aspect 39: The method of any of aspects 33 through 38, further comprising: transmitting, to the second network node, an indication of a status of the one or more network elements, the status indicating whether individual ones of the one or more network elements are active or inactive within the first network.

Aspect 40: The method of any of aspects 33 through 39, further comprising: providing access to the second network for the one or more network elements of the first network, the access provided in accordance with a traffic management policy of at least one of the second network node or the third network node.

Aspect 41: The method of any of aspects 33 through 40, further comprising: transmitting, to the second network node, a report indicative of network usage information of one or more of the one or more network elements of the first network.

Aspect 42: The method of any of aspects 33 through 41, further comprising: establishing a downlink path for communications from the second network to a network element of the one or more network elements of the first network.

Aspect 43: The method of any of aspects 33 through 42, further comprising: managing, independent of the first network, traffic routing for communications between additional network nodes unable to join or not present in the first network.

Aspect 44: The method of any of aspects 33 through 43, wherein the first network node and the network management element are a same network node.

Aspect 45: The method of any of aspects 33 through 44, wherein the first wireless communication technology is a non-cellular technology and the second wireless communication technology is a cellular technology.

Aspect 46: The method of any of aspects 33 through 45, wherein the first network is a PIN.

Aspect 47: An apparatus for wireless communication at a first network node, comprising a memory; and at least one processor coupled to the memory, wherein the at least one processor is configured to perform a method of any of aspects 1 through 18.

Aspect 48: An apparatus for wireless communication at a first network node, comprising at least one means for performing a method of any of aspects 1 through 18.

Aspect 49: A non-transitory computer-readable medium storing code for wireless communication at a first network node, the code comprising instructions executable by a processor to perform a method of any of aspects 1 through 18.

Aspect 50: An apparatus for wireless communication at a first network node, comprising a memory; and at least one processor coupled to the memory, wherein the at least one processor is configured to perform a method of any of aspects 19 through 32.

Aspect 51: An apparatus for wireless communication at a first network node, comprising at least one means for performing a method of any of aspects 19 through 32.

Aspect 52: A non-transitory computer-readable medium storing code for wireless communication at a first network node, the code comprising instructions executable by a processor to perform a method of any of aspects 19 through 32.

Aspect 53: An apparatus for wireless communication at a first network node, comprising a memory; and at least one processor coupled to the memory, wherein the at least one processor is configured to perform a method of any of aspects 33 through 46.

Aspect 54: An apparatus for wireless communication at a first network node, comprising at least one means for performing a method of any of aspects 33 through 46.

Aspect 55: A non-transitory computer-readable medium storing code for wireless communication at a first network node, the code comprising instructions executable by a processor to perform a method of any of aspects 33 through 46.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of information, one or more conditions, one or more factors, or the like. In other words, the phrase "based on A" (where "A"

may be information, a condition, a factor, or the like) shall be construed as "based at least on A" unless specifically recited differently.

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, obtaining, selecting, choosing, establishing and other such similar actions.

In the figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the drawings, describes example configurations and does not represent all the examples that may be implemented or that are within the scope of the claims. The term "aspect" or "example" used herein means "serving as an aspect, example, instance, or illustration," and not "preferred" or "advantageous over other aspects." The detailed description includes specific details for the purpose of providing an understanding of the described techniques. These techniques, however, may be practiced without these specific details. In some instances, structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A first network node for wireless communication, comprising:

a memory; and at least one processor coupled to the memory, wherein the at least one processor is configured to:

receive first information that triggers the first network node to establish a first network that includes a second network node and one or more network elements configured to communicate with each other using a first wireless communication technology;

transmit, based on the first information via a user plane of a second network, second information to a second network node, wherein the second information includes network gateway identification information that identifies the second network node as a network gateway for the first network, wherein the second information includes gateway configuration information indicative of a gateway configuration for the second network node, and wherein the one or more network elements are configured to communicate with the second network via the second network node configured as the network gateway using a second wireless communication technology; and transmit, based on the first information via the user plane of the second network, third information to a third network node, wherein the third information includes network management identification information that identifies the third network node as a network management element for the first network, and wherein the third information includes network management configuration information indicative of a management configuration for the third network node.

2. The first network node of claim 1, wherein the at least one processor is further configured to:

transmit, to at least one of the second network node, the third network node, or a network element of the one or more network elements, registration information to enable one or more additional network elements to Join the first network.

3. The first network node of claim 1, wherein the at least one processor is further configured to:

transmit, to at least one of the second network node, the third network node, or a network element of the one or more network elements, registration information to enable the network element to be at least one of:

an additional network gateway for the first network, or an additional network management element for the first network.

4. The first network node of claim 1, wherein the at least one processor is further configured to:

receive a profile from at least one of the second network node, the third network node, or a network element of the one or more network elements, wherein the profile includes at least one of wireless communication technology capability information or an identifier for association with the first network.

5. The first network node of claim 4, wherein the wireless communication technology capability information indicates that a non-cellular technology is supported by the second network node or the network element from which the profile is received.

6. The first network node of claim 4, wherein the at least one processor is further configured to:

associate the profile with role information indicative of a role in the first network of the second network node, the third network node, or the network element.

7. The first network node of claim 1, wherein the at least one processor is further configured to:

receive an indication of whether a network element of the one or more network elements is active or inactive in the first network.

8. The first network node of claim 1, wherein the at least one processor is further configured to:

receive an indication of whether the first network is active or inactive.

9. The first network node of claim 1, wherein the at least one processor is further configured to:

transmit, to at least one of the second network node, the third network node, or a network element of the one or more network elements of the first network, management policy information of the first network.

10. The first network node of claim 1, wherein the at least one processor is further configured to:

receive billing information pertaining to use of the first network by one or more of the second network node, the third network node, or a network element of the one or more network elements of the first network.

11. The first network node of claim 1, wherein the at least one processor is further configured to:

receive network usage information pertaining to use of the first network by one or more of the second network node, the third network node, or a network element of the one or more network elements of the first network.

12. The first network node of claim 1, wherein the at least one processor is further configured to:

transmit, to at least one of the second network node or the third network node, quality of service control information for communication between the one or more network elements and the second network.

13. The first network node of claim 1, wherein the at least one processor is further configured to:

interface with one or more network functions of the second network regarding access between the first network and the second network.

14. The first network node of claim 13, wherein the access between the first network and the second network is regulated by at least one of a subscription or a policy which is communicated between the first network node and the one or more network functions of the second network.

15. The first network node of claim 13, wherein the one or more network functions of the second network include a network exposure function (NEF), a policy control function (PCF), a unified data management (UDM) function, or a unified data repository (UDR) function.

16. The first network node of claim 1, wherein the second network node and the third network node are a same network node.

17. The first network node of claim 1, wherein the first wireless communication technology is a non-cellular technology and the second wireless communication technology is a cellular technology.

18. The first network node of claim 1, wherein the first network is a personal Internet-of-things network.

19. A first network node for wireless communication, comprising:

a memory; and at least one processor coupled to the memory, wherein the at least one processor is configured to:

transmit first information to a second network node that triggers the establishment of a first network that includes a network gateway and one or more network elements configured to communicate with each other using a first wireless communication technology, wherein the one or more network elements are configured to communicate with a second network via the network gateway using a second wireless communication technology; and receive, in response to the first information via a user plane of the second network, second information from the second network node, wherein the second information includes network management identification information that identifies the first network node as a network management element for the first network, and wherein the second information includes network management configuration information indicative of a management configuration for the first network node.

20. The first network node of claim 19, wherein the at least one processor is further configured to:

communicate with the second network node to establish the first network.

21. The first network node of claim 20, wherein the at least one processor is further configured to:

communicate with the second network node to modify, delete, activate, or deactivate the first network.

22. The first network node of claim 19, wherein the at least one processor is further configured to:

communicate with the second network node to remove a network element of the one or more network elements from the first network.

23. The first network node of claim 19, wherein the at least one processor is further configured to:

communicate with the second network node to add a network element of the one or more network elements to the first network.

24. The first network node of claim 19, wherein the at least one processor is further configured to:

communicate with the second network node to add an additional network element to the first network.

25. The first network node of claim 19, wherein the at least one processor is further configured to:

communicate with the second network node in order to remove the network gateway from the first network.

26. The first network node of claim 19, wherein the at least one processor is further configured to:

communicate with the second network node in order to add the network gateway to the first network.

27. The first network node of claim 19, wherein the at least one processor is further configured to:

communicate with the second network node in order to add an additional network gateway to the first network.

28. The first network node of claim 19, wherein the at least one processor is further configured to:

communicate with the second network node regarding a period of time for which at least one of the first network, the network gateway, or a network element of the one or more network elements are valid.

29. The first network node of claim 19, wherein the at least one processor is further configured to:

communicate with the second network node regarding a status of at least one of the first network or a network element of the one or more network elements, the status indicating whether the first network is active or inactive or whether the network element is active or inactive within the first network.

30. The first network node of claim 19, wherein the first network node and the network gateway are a same network node.

31. The first network node of claim 19, wherein the first wireless communication technology is a non-cellular technology and the second wireless communication technology is a cellular technology.

32. The first network node of claim 19, wherein the first network is a personal Internet-of-things network.

33. A first network node for wireless communication, comprising:

a memory; and at least one processor coupled to the memory, wherein the at least one processor is configured to:

receive first information from a second network node including network gateway identification information that identifies the first network node as a network gateway in a first network, wherein the first network includes the network gateway and one or more network elements configured to communicate with each other using a first wireless communication technology, wherein the one or more network elements are configured to communicate with a second network via the first network node configured as the network gateway using a second wireless communication technology, and wherein the first information is received via a user plane of the second network; and relay communication between the second network and the one or more network elements in accordance with management by a third network node that is a network management element for the first network.

34. The first network node of claim 33, wherein the at least one processor is further configured to:

provision one or more resources to the one or more network elements for communication between the one or more network elements within the first network.

35. The first network node of claim 33, wherein the at least one processor is further configured to:

relay communication between two network elements via the first network in accordance with management by the third network node.

36. The first network node of claim 33, wherein the at least one processor is further configured to:

communicate, with a network element of the one or more network elements, discovery information associated with deletion of the network element from the first network; and transmit an indication to the second network node or the third network node of the deletion.

37. The first network node of claim 33, wherein the at least one processor is further configured to:

communicate, with a network element of the one or more network elements, discovery information associated with addition of the network element to the first network; and transmit an indication to the second network node or the third network node of the addition.

38. The first network node of claim 33, wherein the at least one processor is further configured to:

communicate, with an additional network element, discovery information associated with addition of the additional network element to the first network; and transmit an indication to the second network node or the third network node of the addition.

39. The first network node of claim 33, wherein the at least one processor is further configured to:

transmit, to the second network node, an indication of a status of the one or more network elements, the status indicating whether individual ones of the one or more network elements are active or inactive within the first network.

40. The first network node of claim 33, wherein the at least one processor is further configured to:

provide access to the second network for the one or more network elements of the first network, the access provided in accordance with a traffic management policy of at least one of the second network node or the third network node.

41. The first network node of claim 33, wherein the at least one processor is further configured to:

transmit, to the second network node, a report indicative of network usage information of one or more of the one or more network elements of the first network.

42. The first network node of claim 33, wherein the at least one processor is further configured to:

establish a downlink path for communications from the second network to a network element of the one or more network elements of the first network.

43. The first network node of claim 33, wherein the at least one processor is further configured to:

manage, independent of the first network, traffic routing for communications between additional network nodes unable to join or not present in the first network.

44. The first network node of claim 33, wherein the first network node and the network management element are a same network node.

45. The first network node of claim 33, wherein the first wireless communication technology is a non-cellular technology and the second wireless communication technology is a cellular technology.

46. The first network node of claim 33, wherein the first network is a personal Internet-of-things network.

* * * * *